United States Patent
Strong et al.

(10) Patent No.: US 8,075,201 B2
(45) Date of Patent: Dec. 13, 2011

(54) MOVABLE LENS SYSTEMS AND ASSOCIATED METHODS

(75) Inventors: Craig C. Strong, Portland, OR (US); Samuel L. Pardue, Portland, OR (US); Mark Pratt, Portland, OR (US); Paul Mays, Oregon City, OR (US); William McDonough, Portland, OR (US)

(73) Assignee: Lensbaby, LLC, Portland, OR (US)

( * ) Notice: Subject to any disclaimer, the term of this patent is extended or adjusted under 35 U.S.C. 154(b) by 0 days.

(21) Appl. No.: 12/439,146

(22) PCT Filed: Aug. 27, 2007

(86) PCT No.: PCT/US2007/076911
§ 371 (c)(1),
(2), (4) Date: Feb. 2, 2010

(87) PCT Pub. No.: WO2008/027846
PCT Pub. Date: Mar. 6, 2008

(65) Prior Publication Data
US 2010/0150541 A1    Jun. 17, 2010

Related U.S. Application Data

(60) Provisional application No. 60/841,030, filed on Aug. 30, 2006.

(51) Int. Cl.
G03B 5/06 (2006.01)
G03B 5/04 (2006.01)
G03B 17/04 (2006.01)

(52) U.S. Cl. ......... 396/342; 396/343; 396/344; 396/346

(58) Field of Classification Search .................. 396/341, 396/342, 343, 344, 345, 346, 347
See application file for complete search history.

(56) References Cited

U.S. PATENT DOCUMENTS

| 395,899 A | 1/1889 | Hasey |
| 570,774 A * | 11/1896 | Sanderson .................... 396/343 |
| 1,605,725 A | 11/1926 | Herbert, Jr. |
| 1,792,997 A | 2/1931 | Marks |

(Continued)

FOREIGN PATENT DOCUMENTS
DE    2156886    5/1972
(Continued)

OTHER PUBLICATIONS

Bjørn Rørslett/NN, "The PC-Nikkor 28 mm f/3.5 Modified Tilt/Shift Lens," Oct. 1, 2002, 3 pages <http://www.naturfotograf.com/28pc.html> [accessed Oct. 5, 2003].

(Continued)

Primary Examiner — Rodney Fuller
(74) Attorney, Agent, or Firm — Marger Johnson & McCollom PC

(57) ABSTRACT

Techniques in both still photography and moving picture photography can be enhanced with a lens system that includes a movable or flexible lens body carrying a lens. The lens body and lens can be moved to multiple user selected positions. The system further includes a retention device that is configured to retain the flexible lens body in the various user selected positions. In selected embodiments, the system includes an actuator for tilting the lens relative to a camera and/or for focusing the camera lens system.

17 Claims, 21 Drawing Sheets

U.S. PATENT DOCUMENTS

| | | | |
|---|---|---|---|
| 2,301,921 A * | 11/1942 | Willcox | 396/342 |
| 2,316,694 A | 4/1943 | Jarboe | |
| 2,723,593 A | 11/1955 | Gruner et al. | |
| 3,262,360 A | 7/1966 | Gruner et al. | |
| 3,479,945 A | 11/1969 | Koch | |
| 3,623,415 A | 11/1971 | Atzmuller | |
| 3,713,725 A | 1/1973 | Uesugi et al. | |
| 3,796,569 A | 3/1974 | Kondo et al. | |
| 3,799,151 A | 3/1974 | Fukami et al. | |
| 3,825,938 A | 7/1974 | Koch et al. | |
| 3,904,279 A | 9/1975 | Sanada | |
| 4,196,990 A | 4/1980 | Forsyth | |
| 4,229,094 A | 10/1980 | Baab et al. | |
| 4,251,134 A | 2/1981 | Sato et al. | |
| 4,264,161 A | 4/1981 | Hosoe et al. | |
| 4,264,167 A | 4/1981 | Plummer | |
| 4,281,916 A | 8/1981 | Aoyagi | |
| 4,291,944 A | 9/1981 | Nomura | |
| 4,299,470 A | 11/1981 | Shimizu | |
| 4,771,302 A | 9/1988 | Hamada et al. | |
| 4,946,255 A | 8/1990 | Mizoguchi et al. | |
| 4,949,126 A | 8/1990 | Frelier et al. | |
| 5,168,298 A | 12/1992 | Hirai et al. | |
| 5,194,988 A | 3/1993 | Flother et al. | |
| 5,211,471 A | 5/1993 | Rohrs | |
| 5,289,215 A | 2/1994 | Clairmont et al. | |
| 5,309,541 A | 5/1994 | Flint | |
| 5,592,331 A | 1/1997 | Eastcott | |
| 5,625,851 A * | 4/1997 | Boxer | 396/341 |
| 5,640,630 A | 6/1997 | Hattan | |
| 5,682,199 A | 10/1997 | Lankford | |
| 5,790,319 A | 8/1998 | Okada et al. | |
| 5,825,461 A | 10/1998 | Ruffell et al. | |
| 5,841,590 A | 11/1998 | Sato et al. | |
| 5,873,817 A | 2/1999 | Kokish et al. | |
| 6,318,912 B1 | 11/2001 | Shono et al. | |
| 6,503,000 B1 | 1/2003 | Kim et al. | |
| 6,556,363 B2 | 4/2003 | Chiu | |
| 6,590,574 B1 | 7/2003 | Andrews | |
| 6,597,518 B2 | 7/2003 | Nomura et al. | |
| 7,085,082 B2 | 8/2006 | Donner et al. | |
| 7,242,540 B1 | 7/2007 | Zhao et al. | |
| 7,450,832 B2 | 11/2008 | Nomura | |
| 2002/0003965 A1 | 1/2002 | Landelle et al. | |
| 2004/0125471 A1 | 7/2004 | Chen | |
| 2006/0115254 A1 | 6/2006 | Nomura | |
| 2006/0115256 A1 | 6/2006 | Nomura | |
| 2006/0115257 A1 | 6/2006 | Nomura | |
| 2007/0024740 A1 | 2/2007 | Strong | |
| 2007/0189765 A1 | 8/2007 | Schulte | |

FOREIGN PATENT DOCUMENTS

| | | |
|---|---|---|
| DE | 2302695 | 8/1973 |
| DE | 7302053 | 8/1973 |
| DE | 2215086 | 10/1973 |
| DE | 2801994 | 7/1979 |
| DE | 2829927 | 1/1980 |
| DE | 2855496 | 7/1980 |
| DE | 3047096 | 7/1982 |
| DE | 3304115 | 8/1984 |
| DE | 3423596 | 1/1986 |
| DE | 3627115 | 2/1986 |
| DE | 3436886 | 4/1986 |
| DE | 3627145 | 2/1988 |
| DE | 3835061 | 4/1989 |
| DE | 4021375 | 1/1991 |
| DE | 4201169 | 7/1992 |
| DE | 9311283 | 10/1993 |
| DE | 4230838 | 3/1994 |
| DE | 29609096 | 11/1996 |
| DE | 1029053 | 1/1997 |
| DE | 19715451 | 12/1998 |
| DE | 19804449 | 8/1999 |
| DE | 20000242 | 5/2000 |
| DE | 10033150 | 1/2001 |
| DE | 10229053 | 3/2004 |
| DE | 10336817 | 4/2004 |
| DE | 10359193 | 7/2005 |
| DE | 102004008072 | 10/2005 |
| DE | 102005057411 | 6/2006 |
| DE | 102005057412 | 6/2006 |
| DE | 102005057495 | 6/2006 |
| DE | 102005057514 | 6/2006 |
| DE | 102005048425 | 4/2007 |
| EP | 507848 | 10/1992 |
| EP | 841583 | 5/1998 |
| EP | 974862 | 1/2000 |
| EP | 1102107 | 5/2001 |
| EP | 1168831 | 1/2002 |
| EP | 1331807 | 7/2003 |
| EP | 1336206 | 8/2003 |
| EP | 1466209 | 10/2004 |
| EP | 1671180 | 6/2006 |
| EP | 1712952 | 10/2006 |
| EP | 1723782 | 11/2006 |
| FR | 1592675 | 5/1970 |
| FR | 2660080 | 9/1991 |
| GB | 1285619 | 8/1972 |
| GB | 1370197 | 10/1974 |
| JP | 63197926 | 8/1988 |
| JP | 07123304 | 5/1995 |
| WO | WO-9110157 | 7/1991 |
| WO | WO-03058340 | 7/2003 |
| WO | WO-2005036249 | 4/2005 |
| WO | WO-2005060240 | 6/2005 |
| WO | WO-2007042402 | 4/2007 |

OTHER PUBLICATIONS

HP Marketing Corp., "Linhof Technikardan Cameras", New Jersey, 4 pages <http://www.hpmarketingcorp.com/Product%20descriptions/tk.html> [accessed Oct. 5, 2003].

International Search Report and Written Opinion for PCT/US07/76911; Lensbabies, LLC; Mar. 18, 2008.

Mark Tucker, "The PlungerCam: The Ugliest Camera Known to Man," 4 pages <http://marktucker.com/plungercam/index.html> [accessed Oct. 5, 2003].

Zörk Film & Phototechnic, "Multi Focus System," 1998, 3 pages <http://www.zoerk.com/pages/p_mfs.htm> [accessed Oct. 5, 2003].

* cited by examiner

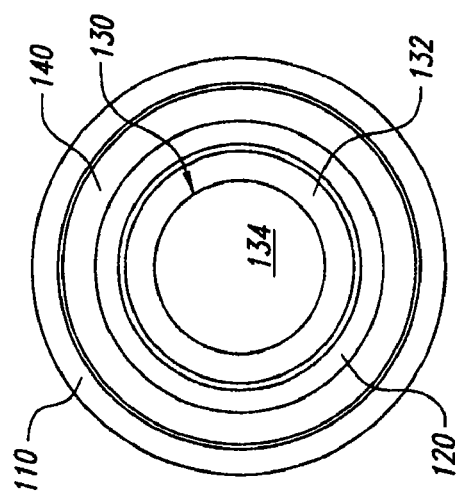
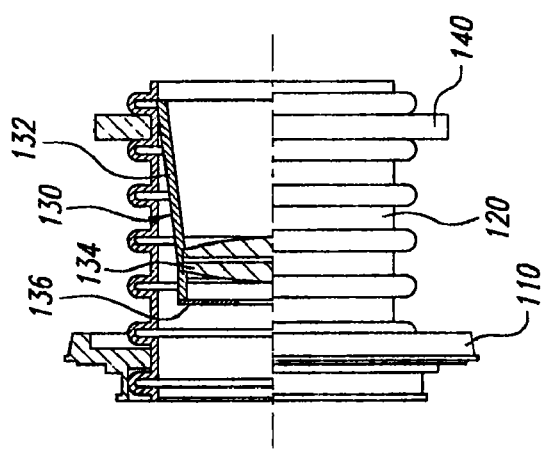
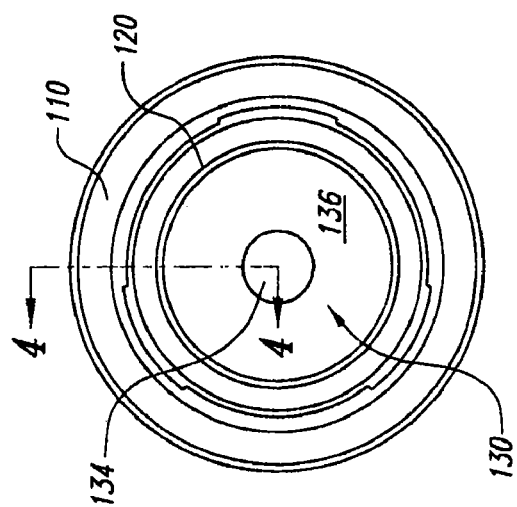

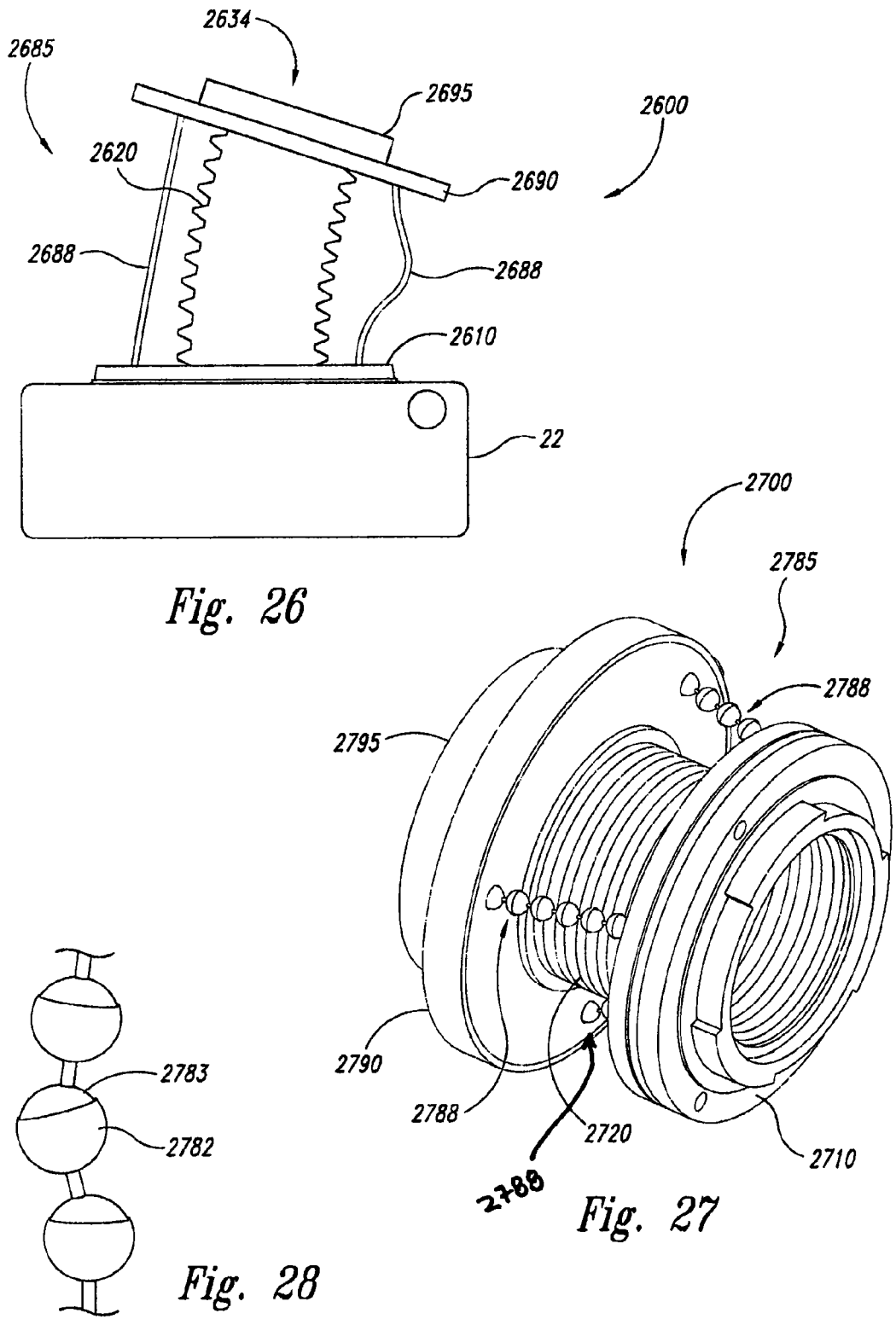

MOVABLE LENS SYSTEMS AND ASSOCIATED METHODS

CROSS-REFERENCE TO RELATED APPLICATION(S)

This application is a national phase application of International Application No. PCT/US07/076911, entitled MOVABLE LENS SYSTEMS AND ASSOCIATED METHODS, filed Aug. 27, 2007, which claims priority to and the benefit of U.S. Provisional Patent Application No. 60/841,030, entitled MOVABLE LENS SYSTEMS AND ASSOCIATED METHODS, filed Aug. 30, 2006, each of which are fully incorporated herein by reference.

TECHNICAL FIELD

The present invention generally relates to photography, including both still photography, video photography, and motion film photography. In some embodiments, the invention provides retention devices and/or lens tilt actuators suitable for use with movable lens systems.

BACKGROUND

Upon photographing a large surface, the entirety of the object to be taken cannot always fit within a field of focus. In such a case, the close and/or distant portion(s) of the object become out of focus. Photographers can expand the area of potential focus with an adapter having a tilt mechanism, typically a tilt/shift lens, that tilts the photographic lens relative to the camera body. Unfortunately, most existing tilt and shift lenses are precision instruments that employ precisely adjusted mechanical controls to focus the lens and to adjust the angle of the lens relative to the image capture plane (which may be film or a digital sensor, depending on the type of camera).

The precise control may be useful for some controlled settings in studios, but can significantly complicate photography in the field. The general perception of tilt/shift lenses is that they are cumbersome to use, slow to operate, demand tripod use, and can require manual, instead of automatic, exposure modes. Conventional tilt/shift lenses are relatively heavy, as well, further limiting their practical use. These lenses are also quite expensive, with most commercial tilt/shift lenses costing well in excess of US$1,000.

Some photographers also use bellows cameras to achieve photographic effects. For example, such cameras may be used to produce artistic effects, such as soft focus images wherein a portion of the image may be in sharp focus but a peripheral region may be out of focus. Many bellows cameras rely on heavy, cumbersome rails that protrude from the bottom of the camera to guide the lens as it moves in and out relative to the camera body. This added weight and mechanical complexity has largely limited bellows cameras to studio photography.

Digital cameras can allow more experimental and spontaneous photos because the photographer does not have to bear the time and expense associated with capturing images. The bulky nature and tedious operation of conventional tilt/shift lenses and bellows lenses can significantly slow down the process of digital photography, and thus in some circumstances, impede the spontaneity that could otherwise be achieved.

BRIEF DESCRIPTION OF THE DRAWINGS

FIG. 3 is a rear view of the lens system of FIG. 2.

FIG. 4 is a side view, in partial cross section (taken along line 4-4 in FIG. 3), of the lens system of FIGS. 2 and 3.

FIG. 5 is a front view of the lens system of FIGS. 2-4.

FIG. 26 is a partially schematic top plan view of a lens system in accordance with another embodiment of the invention.

FIG. 27 is an isometric illustration of a lens system in accordance with still another embodiment of the invention.

FIG. 28 is a partially schematic illustration of a portion of a flexible support element shown in FIG. 27.

DETAILED DESCRIPTION

A. Overview

Figure 1:
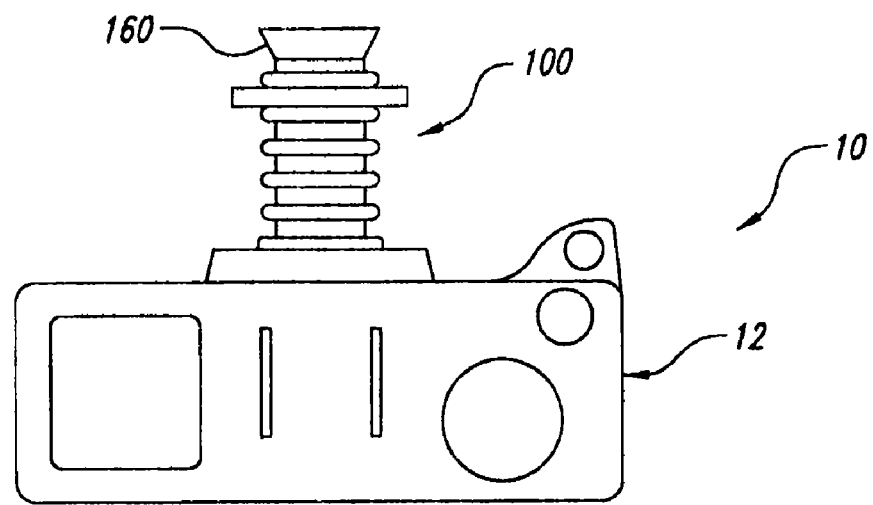
FIG. 1 is a top plan view schematically illustrating a camera system having a lens system and an optical device in accordance with an embodiment of the invention.

Various embodiments of the present invention provide flexible lens systems and camera systems employing retention devices and/or lens tilt actuators. Except where context dictates otherwise, the term "lens" is used throughout to include both a single lens and a set of lenses and the term "photography" is used throughout to include both still and video photography accomplished using a camera system (e.g., a conventional 35 mm camera (e.g., film camera), a digital camera, a motion picture film camera, a video camera, a camera or recorder for capturing moving pictures, and the like). Similarly, except where context dictates otherwise, the term photograph is used throughout to include one or more images produced, at least in part, by a camera system (e.g., conventional photograph(s) (e.g., using conventional film), digital image(s), video recording(s) of any format, motion film photography, and the like). Furthermore, except where context dictates otherwise, the term video is used throughout to include any and/or all types of moving picture images (e.g., imaging or image series) including various types of analog imaging, digital imaging, motion picture film, and the like. The following description provides specific details of certain embodiments of the invention illustrated in the drawings to provide a thorough understanding of those embodiments. It should be recognized, however, that the present invention can be reflected in additional embodiments and the invention may be practiced without some of the details in the following description.

One aspect of the invention is directed toward a lens system that includes a lens, a fitting couplable to a camera, and a body extending between the lens and the fitting. The body is configured so that at least a portion of the body is movable to allow the lens to be moved among at least two operative positions relative to the camera when the fitting is coupled to the camera. The system further includes a retention device coupled to the body and the fitting. The retention device has an engaged configuration and a disengaged configuration. In the engaged configuration the retention device retains the at least a portion of the body in at least one user selected position. In the disengaged configuration the retention device does not retain the at least a portion of the body in the at least one user selected position.

Another aspect of the invention is directed toward a camera system that includes a lens and a body extending between the lens and a camera. The body is configured so that at least a portion of the body is movable to allow the lens to be moved among at least two operative positions relative to the camera. The system further includes a retention device coupled to the body and the camera. The retention device has an engaged configuration and a disengaged configuration. In the engaged configuration the retention device retains the at least a portion of the body in at least one user selected position. In the disengaged configuration the retention device does not retain the at least a portion of the body in the at least one user selected position.

Still another aspect of the invention is directed toward a lens system that includes a lens couplable to a camera and at least one actuator coupled to the lens and couplable to the camera. The at least one actuator being configured to tilt the lens among at least two operative positions relative to the camera when the lens and the actuator are coupled to the camera. The system further includes a control device operatively coupled to the at least one actuator to command the actuator to tilt the lens.

Yet another aspect of the invention is directed toward a lens system that includes a lens, a fitting couplable to a camera, and a body extending between the lens and the fitting. The body is configured so that at least a portion of the body is movable to allow the lens to be moved among at least two operative positions relative to the camera when the fitting is coupled to the camera. The system further includes retention means for retaining the at least a portion of the body in at least one user selected position when the retention means is in an engaged configuration. The retention means having a disengaged configuration wherein the retention means does not retain the at least a portion of the body in the at least one user selected position.

Still another aspect of the invention is directed toward a lens system that includes a lens couplable to a camera and actuation means for tilting the lens among at least two operative positions relative to the camera when the lens and the actuation means are coupled to the camera. The system further includes a control device for commanding the actuation means to tilt the lens.

Yet another aspect of the invention is directed toward a lens system that includes a lens, a fitting couplable to a camera, and a body extending between the lens and the fitting. The body is configured so that at least a portion of the body is movable to allow the lens to be moved among at least two operative positions relative to the camera when the fitting is coupled to the camera. The system further includes a retention device coupled to the body and the fitting. The retention device includes a flexible support element. The flexible support element is bendable to allow the body to be moved among at least two user selected positions. The flexible support element is configured to urge the lens to remain in each user selected position once the lens has been placed in the corresponding user selected position.

Still another aspect of the invention is directed toward a lens system that includes a lens, a fitting couplable to a camera, and a body extending between the lens and the fitting. The body is configured so that at least a portion of the body is movable to allow the lens to be moved among at least two operative positions relative to the camera when the fitting is coupled to the camera. The system further includes retention means coupled to the body and the fitting. The retention means being bendable to allow the body to be moved among at least two user selected positions. The retention means being configured to urge the lens to remain in each user selected position once the lens has been placed in the corresponding user selected position.

Yet another aspect of the invention is directed toward a camera system that includes a lens and a body extending between the lens and a camera. The body is configured so that at least a portion of the body is movable to allow the lens to be moved among at least two operative positions relative to the camera. The system further includes a retention device coupled to the body and coupled to the camera. The retention device includes a flexible support element. The flexible support element is bendable to allow the body to be moved among at least two user selected positions. The flexible support element is configured to urge the lens to remain in each user selected position once the lens has been placed in the corresponding user selected position.

Still another aspect of the invention is directed toward a method for adjusting focus of a camera using a lens system that includes orienting a camera with respect to a subject. The camera having a lens system that includes a lens, a body extending between the camera and the lens, and a retention device in a disengaged configuration. The body is configured so that at least a portion of the body is movable to allow the lens to be moved among at least two operative positions relative to the camera. In the disengaged configuration the retention device does not retain the at least a portion of the body in a selected position. The method further includes positioning the at least a portion of the body in a user selected position and engaging the retention device to retain the at least a portion of the body in the user selected position.

Yet another aspect of the invention is directed toward a method for adjusting focus of a camera using a lens system that includes orienting a camera with respect to a subject. The camera has a lens system that includes a lens coupled to the camera and an actuator coupled to the lens and the camera. The actuator is configured to tilt the lens among at least two operative positions relative to the camera. The method further includes tilting the lens from a first user selected position to a second user selected position using the actuator.

Still another aspect of the invention is directed toward a method for adjusting focus of a camera using a lens system that includes orienting a camera with respect to a subject. The camera has a lens system that includes a lens, a body extending between the camera and the lens, and a retention device that includes a flexible support element. The flexible support element is bendable to allow the body to be moved among at least two user selected positions. The flexible support element is configured to urge the body to remain in each user selected position once the body has been placed in the corresponding user selected position. The method further includes positioning the at least a portion of the body in one of the at least two user selected positions.

For ease of understanding, the following discussion is broken down into four areas of emphasis. The first section discusses various flexible lens systems and camera systems employing flexible lens systems in accordance with embodiments of the invention. The second section outlines methods of taking photographic images in accordance with other embodiments of the invention. The third section discusses various lens systems having retention devices and/or lens tilt actuators, including those suitable for use with movable lens bodies, in accordance with selected embodiments of the invention. The fourth section outlines additional methods of taking photographic images in accordance with still other embodiments of the invention.

B. Flexible Lens Systems and Camera Systems Employing Flexible Lens Systems

FIGS. 1-6 schematically illustrate a camera system 10 and a lens system 100 in accordance with embodiments of the invention. The camera system 10 (FIG. 1) generally includes the lens system 100 coupled to a camera body or camera 12. The camera 12 may be any type of camera system. In one embodiment, the camera 12 comprises a 35 millimeter camera, e.g., a 35 millimeter SLR camera. In other embodiments, the camera 12 can include a larger or smaller format camera (e.g., a camera with a larger or smaller lens and/or image capture size). In one useful embodiment of the invention, the camera 12 comprises a digital camera having a suitable display (not shown) for viewing an image captured by the camera, as is conventional in the art.

Also in FIG. 1, an optical device 160 (e.g., a filter or conversion lens) for providing various optical affects (e.g., softening a photographic image) is coupled to the lens system 100. The optical device 160 and the lens system 100 can be configured so that the optical device 160 is releasably coupled to the lens system 100 opposite from where the lens system 100 couples to the camera 12. In other embodiments, the optical device 160 can be permanently attached to the lens system 100. In still other embodiments of the invention, an optical device 160 is not used.

FIGS. 2-5 illustrate aspects of a lens system 100 in accordance with one embodiment of the invention. The lens system 100 includes a camera mount or fitting 110, a flexible body 120, and a lens assembly 130 (FIGS. 3-5). The camera mount 110 may be a plastic or aluminum mount of the type commonly used to mount a lens to a camera. In other embodiments, the camera mount 110 can have other configurations and/or can be made of other materials including metal alloys and/or composite materials. The mounting system may differ from one camera to another, e.g., from a Canon to a Nikon, but the camera mount 110 is easily adaptable for use with a wide variety of camera bodies 12. In certain useful embodiments, the fitting 110 can be the sole support for the lens system 100 relative to the camera 12.

The flexible body 120 of the lens system 100 is coupled to the camera mount 110 adjacent to an end of the body 120. This permits the camera mount 110 to effectively attach the lens body 120 to the camera 12. The lens body 120 may be formed of a flexible tubular material. In the illustrated embodiment, the tubular material is generally circular in cross section. In other embodiments, the tubular body 120 may have a cross section that is not circular, e.g., ovoid, square, hexagonal, or any other suitable polyhedral shape. The length and transverse dimensions of the lens body 120 can be varied as desired (e.g., for different uses and/or different camera formats). Smaller bodies 120 will generally be lighter and more flexible than a larger body 120 formed of the same material. However, a body 120 having a larger transverse dimension (e.g., diameter in the illustrated embodiment) allows greater light capture and facilitates use of better quality lenses 134 (discussed below).

The body 120 should be sufficiently stiff to support the lens assembly 130 with respect to the camera 12, yet allow a user to flex the body 120 in a desired direction with relative ease. This feature can allow the user to move the body 120 and lens assembly 130 to various operative positions (e.g., positions where a photograph can be taken) to obtain various focusing effects. This is facilitated in the illustrated embodiment by forming the body 120 from a flexible polymeric material with a series of compressible ridges that can compress and/or expand as the body 120 is moved.

Figure 2:
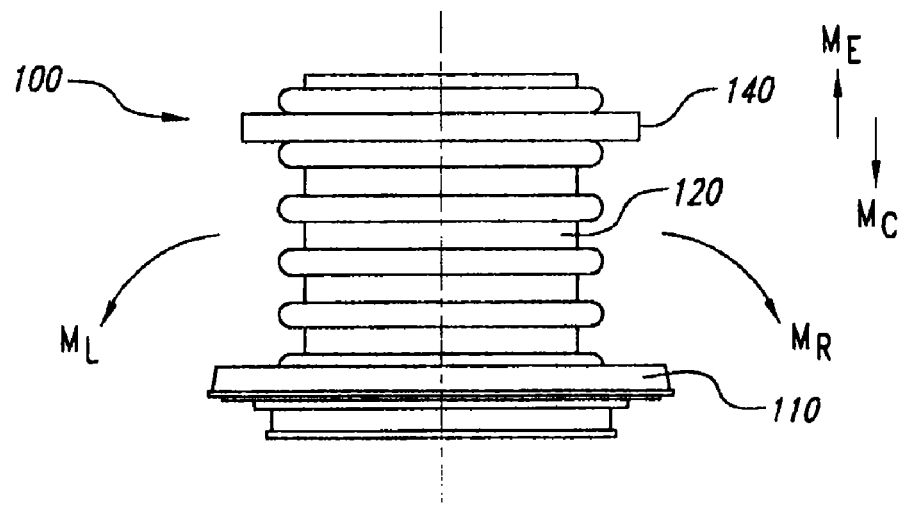
FIG. 2 is a top plan view of the lens system in FIG. 1.

For example, one side of the body 120 can be compressed and an opposite side of the body 120 can be expanded to move the body and lens assembly 130 left or right as indicated by arrows $M_L$ and $M_R$ (shown in FIG. 2). The body 120 can be flexed up or down in a similar manner. The body 120 can also be compressed in the direction of arrow $M_C$ (shown in FIG. 2), shortening its length and moving the lens assembly 130 closer to the camera 12 (shown in FIG. 1), without materially changing the diameter of the body 120. Similarly, the body 120 can be expanded in the direction of arrow $M_E$ (shown in FIG. 2), lengthening the body 120 and moving the lens assembly 130 away from the camera 12 (shown in FIG. 1). Other embodiments can include other arrangements, for example, a body 120 that can be compressed, but not expanded; a body made from a different type of material (e.g., a composite), and/or a body without ridges. In still further embodiments, at least a portion of the flexible body 120 is formed from a rigid material and at least a portion of the body 120 is formed from a flexible material.

In the illustrated embodiment, the body 120 tends to resiliently return toward a rest position, which may be approximately perpendicular to the camera body 12 (FIG. 1), after removing (a) bending, compressing, and/or extending force (s). Accordingly, the bending, compressing, and/or extending force(s) must be maintained to hold the body 120 and lens assembly 130 in a selected operative position relative to the body of the camera 12.

In another embodiment, the body 120 can hold a selected position once it is moved to a selected position (e.g., the body 120 and lens assembly 130 can be placed in multiple operative positions). For example, the ridges can be configured to operate like the ridges on a bendable drinking straw and hold the body and lens assembly in the position in which they are placed by a user. In such an implementation, the body can selectively retain any one of a plurality of discrete configurations by selectively collapsing portions of at least some of the ridges, much in the same way that a bendable drinking straw can be bent between different configurations and retain each of those configurations. Each one of these configurations positions the lens 130 in a different operative position relative to the body of the camera 12 and the fitting 110.

Turning to FIGS. 3-5, the lens assembly 130 generally includes a lens support 132, a lens 134, and an aperture or f-stop 136. In the illustrated embodiment, the lens 134 is spaced rearwardly from the front end of the body 120 by the lens support 132. To permit easy flexure of the body 120, the lens support 132 may have a smaller dimension adjacent the lens than forwardly where it is attached to the body 120, allowing at least a portion of the lens support 132 to move relative to a portion of the body 120. In the particular embodiment shown in FIG. 4, the support 132 is generally frustoconical. Other embodiments can have other arrangements, for example, the lens 134 can be mounted directly to the body. As discussed above, the lens 134, shown schematically in FIG. 4, can include a single lens or multiple lenses that are closely spaced together. In other embodiments, the body can support multiple lenses separated by a larger distance.

In the illustrated embodiment, the f-stop is a fixed aperture that controls how much light passes through the body 120 to the camera in a selected increment of time. In other embodiments, the f-stop can be replaceable, e.g., it may be a removable disk with an aperture that can be replaced by another disk having a differently sized aperture. In still other embodiments, the f-stop can be adjustable. For example, the f-stop can include a series of overlapping blades that can be moved or adjusted relative to each other to form different size apertures, similar to the f-stop used on current lenses. In yet other embodiments, the lens support 132 and/or the lens body 120 can form or act as an f-stop, controlling the volume of light that passes through the body 120 to the camera 12.

In one embodiment, a user may simply grasp the body 120 to manipulate or bend it. In the illustrated embodiment, a focusing collar 140 is carried by the body 120 adjacent its distal end. The illustrated focusing collar 140 is generally annular in shape, though other suitable shapes, e.g., square, may be used. Instead of a continuous collar, as shown, the focusing collar 140 may comprise a series of laterally outwardly extending flanges spaced at a fixed location about the periphery of the body 120. The focusing collar 140 may be formed of plastic, metal (e.g., aluminum), or any other suitable material.

Figure 6:
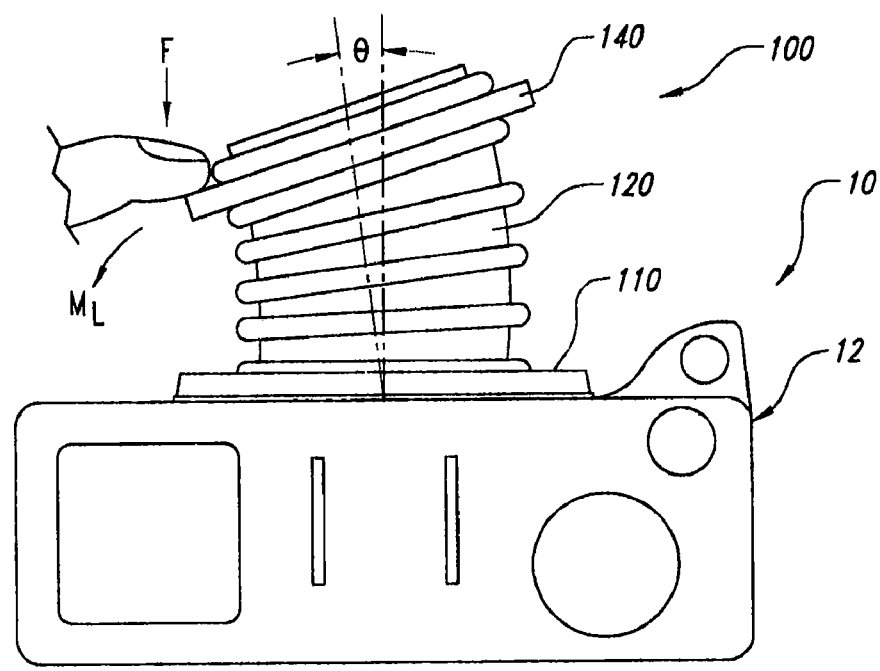
FIG. 6 is a top plan view schematically illustrating movement of the lens system of FIGS. 2-5 in accordance with one embodiment of the invention.

As suggested in FIG. 6, the body 120 of the lens system 100 can be flexed by manually engaging the focusing collar 140 (e.g., with a finger 150) and applying a force F adjacent a side of the focusing collar 140. This will tend to compress the body 120 on one lateral side and may also stretch or extend the body 120 on the other lateral side, moving the body 120 and lens assembly 130 (shown in FIG. 4) as indicated by arrow $M_L$. This can have the effect of moving one portion (e.g., side or edge) of the lens 134 toward the camera 12 and another portion (e.g., an opposite side or edge) away from the camera. The center of the lens 134 can also move relative to the camera 12. The angle θ through which the body 120 can be flexed can vary significantly depending on the relative dimensions and flexibility of the body 120 and the relative dimensions and positions of the lens 134 and f-stop aperture 136 within the body 120. In one embodiment, the angle θ may be 90° or more (e.g., using a reflective element). As discussed above, in certain embodiments, the body 120 can be manually extended or compressed to move the lens 134 away from or toward the camera 12, respectively.

The very simple design of the lens system 100 shown in FIGS. 1-6 allows lens systems in accordance with embodiments of the invention to be appreciably smaller and lighter than conventional tilt/shift camera lenses on the market today. By employing a relatively lightweight body 120 that has sufficient stiffness to support the lens assembly 130 with respect to the camera, the rails commonly required to support bellows lenses can be eliminated. Accordingly, lens systems 100 in accordance with certain embodiments of the invention can be quickly positioned to allow rapid operation with reduced weight as compared to the complex, finely-machined adjusting mechanisms of tilt/shift lenses. This is particularly convenient in the case of digital photography, which in certain instances can allow more spontaneity with less concern about precise results. The mechanical simplicity of the lens system 100 also allows it to be manufactured much less expensively than conventional tilt/shift lenses, permitting sale to a wide range of consumers instead of the limited appeal of conventional tilt/shift lenses to professional photographers or avid hobbyists.

C. Methods of Taking Photographic Images

As noted above, other embodiments of the invention provide methods of taking photographic images. In the following discussion, reference is made to camera system 10 of FIG. 1, and the particular flexible lens system 100 illustrated in FIGS. 2-6. It should be understood, though, that reference to these particular systems is solely for purposes of illustration and that the methods outlined below are not limited to any particular camera system or lens system shown in the drawings or discussed in detail above.

The camera system 10 with its lens system 100 can allow a photographer to achieve special focusing effects in a pliable, enjoyable to use, spontaneous fashion, in contrast to a cumbersome, hard-to-adjust tilt/shift lens, bellows camera, or perspective control lens. As discussed above, the lens system 100 can also be lighter, smaller, and easier to manufacture than previous or existing lenses.

Figure 7:
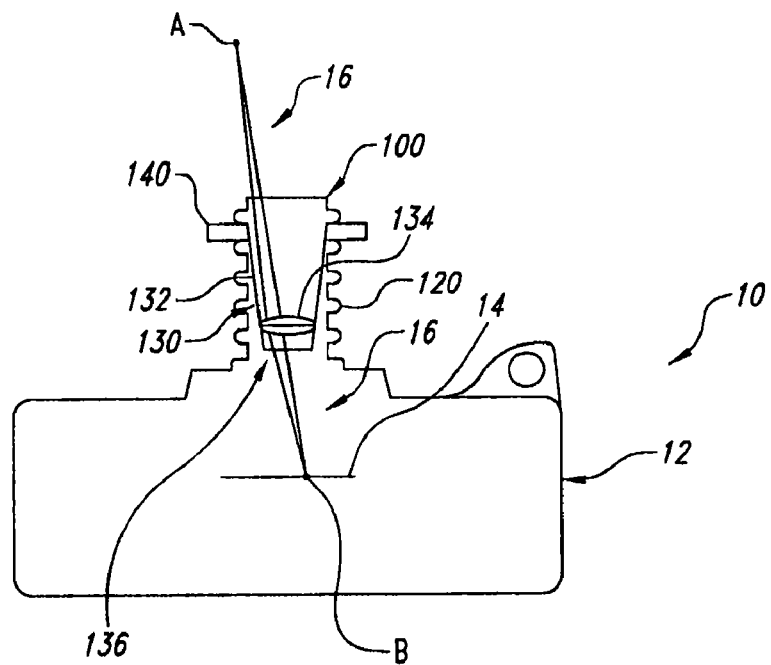
FIG. 7 is a top cross-sectional schematic illustration of the camera system shown in FIG. 1 with the optical device removed and showing an image capture plane.

The lens system 100 allows a photographer, while shooting photographs of active or inactive subjects, to use his or her finger(s) to manipulate freely and easily the lens angle and/or lens location relative to the image capture plane 14, shown in FIG. 7, to focus the camera system 10. Changing the lens angle and/or lens location relative to the camera 12 controls how light hits the image capture plane 14 (e.g., film or digital sensor). For example, in FIG. 7, the light reflected from point A (e.g., a subject) enters the camera and impacts the image capture plane at point B so that the image or subject will generally be in sharp focus. If desired, a user can focus the lens system 100 by positioning the body 120 so that a portion of the light reflected from point A enters the camera and is dispersed when it contacts the image capture plane 14 so that at least a portion of the image is not in sharp focus (e.g., the image is softer and/or blurred). Additionally, as point A moves relative to the camera, the user can focus the lens system 100 by moving the body to keep the image in sharp focus or to make at least a portion of the image softer.

The user may focus the camera system 10 by manually moving the lens assembly 130 in and out relative to the camera 12, and/or bending the body 120 in any direction relative to the camera body 12. Moving the lens assembly 130 away from the camera 12 (e.g., extending the body 120) allows the lens 134 to bring objects that are close to the camera into sharp focus. Compressing the body 120 moves the lens assembly 130 toward the camera, allowing the lens 134 to bring objects that are further away from the camera into sharp focus and/or allowing the lens 134 to focus at infinity.

The user can also change the area of the picture plane that is generally in sharp focus by pulling or extending a portion of the body 120. For example, in certain situations, the user can pull one point on the focusing collar 140 toward the camera, which causes the body 120 to bend up, down, left, and/or right. Correspondingly, the lens 134 within the body 120 moves relative to the camera 12 and can tilt up, down, left, and/or right. This can cause certain portions of the image or subject to come into sharp focus and other portions to the image to be softer or blurred. In other situations, bending the body 120 can cause a subject that is at an oblique angle to the camera 12 to be entirely in sharp focus.

One aspect of this operation is known in the art as the "Scheimpflug effect," which allows you to increase effective depth-of-field simply by tilting the camera lens along its axis in the direction of the image plane. This technique of sharpness distribution control, which is normally only possible with the swing and tilt movements of conventional tilt/shift lenses, allows you to align the lens with any subject plane without changing the camera position or stopping down the lens (e.g., reducing the f-stop). This means that you can use a wider aperture and a faster shutter speed, reducing or eliminating the risk of camera shake or blur due to subject movement, or simply have greater overall depth-of-field for a given aperture. Additionally, this same principle can allow a photographer to intentionally soften or blur portions of the image to achieve more creative, photojournalistic-style compositions.

Figure 8A:
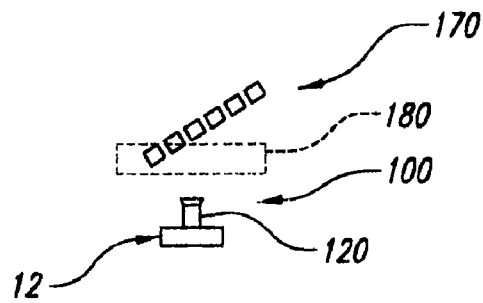
FIG. 8A is a partially schematic illustration of the camera system shown in FIG. 7 photographing a series of objects that are oblique to the camera body.

FIG. 8A is a partially schematic illustration of the camera system shown in FIG. 7 photographing a series of objects that are at an oblique angle to the camera body 12. The lens system 100 is approximately perpendicular to the camera body 12 and the focus area 180 where objects will generally be in sharp focus is depicted by the area enclosed by dashed lines. Those objects 170 that are within the focus area 180 will generally appear to be in sharp focus. Those objects 170 that are not in the focus area 180 will not appear to be in sharp focus and can appear softer and/or blurred. The further away an object 170 is from the focus area 180, the softer or more blurred its image can appear. The focus area 180 can be moved by compressing, extending, and/or bending the lens body 120 of the lens system 100. For example, by compressing the body (e.g., compressing the body without bending the body), the focus area 180 can be moved away from the camera.

Figure 8B:
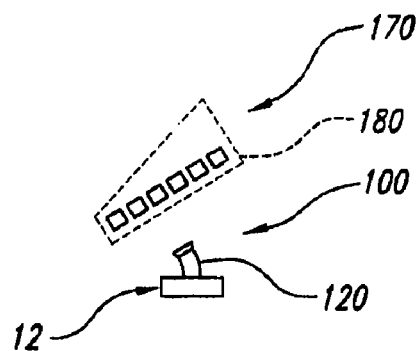
FIG. 8B is a partially schematic illustration of the camera system in FIG. 8A photographing a series of objects from a different orientation than the one shown in FIG. 8A.
Figure 8C:
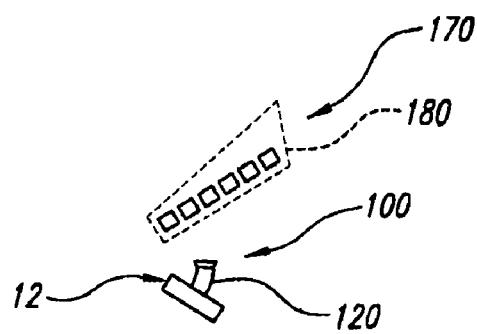
FIG. 8C is a partially schematic illustration of the camera system in FIG. 8A photographing a series of objects from a different orientation than the ones shown in FIGS. 8A and 8B.

The shape and/or orientation of the focus area relative to the camera body 12 can also be adjusted, as shown in FIGS. 8B and 8C. In FIGS. 8B and 8C the camera body 12 has been placed at different angles relative to a series of objects 170. The body 120 of the lens system 100 has been bent toward the objects so that the focus area 180 (shown in dashed lines) includes all of the objects 170. Accordingly, all the objects 170 will appear to be in generally sharp focus even though they are at varying distances from the camera 12. The user intuitively knows when this point is reached because the image in the camera viewfinder appears in focus from close range to distant range (e.g., all the objects appear to be in sharp focus). This feature/principle can also be used to move the focus area 180 so that certain objects 170 are not in sharp focus (e.g., are not in the focus area 180).

Figure 9A:
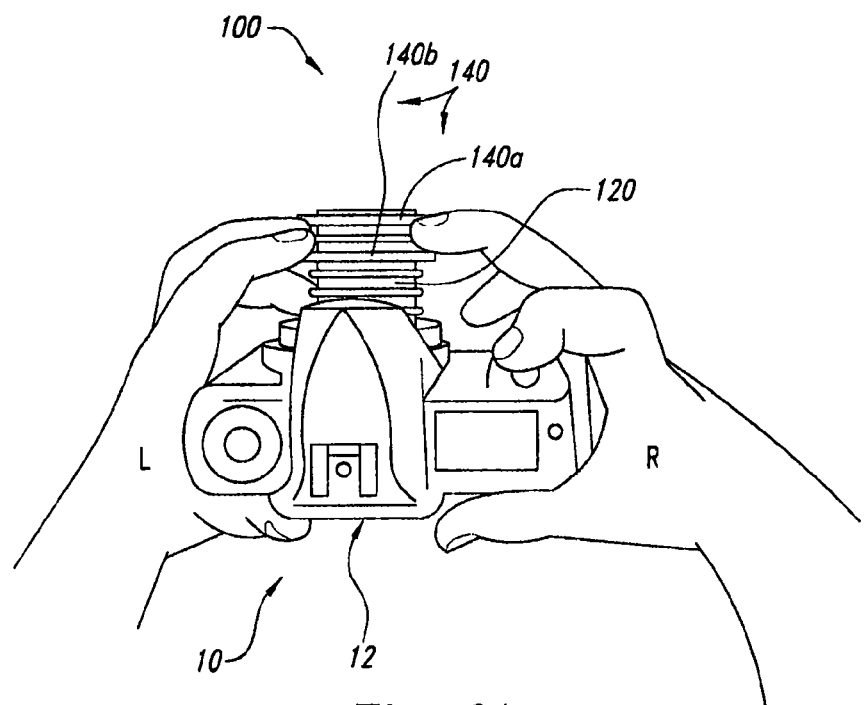
FIG. 9A is a partially schematic illustration of a camera system having a lens body with at least two focusing collars in accordance with another embodiment of the invention.
Figure 9B:
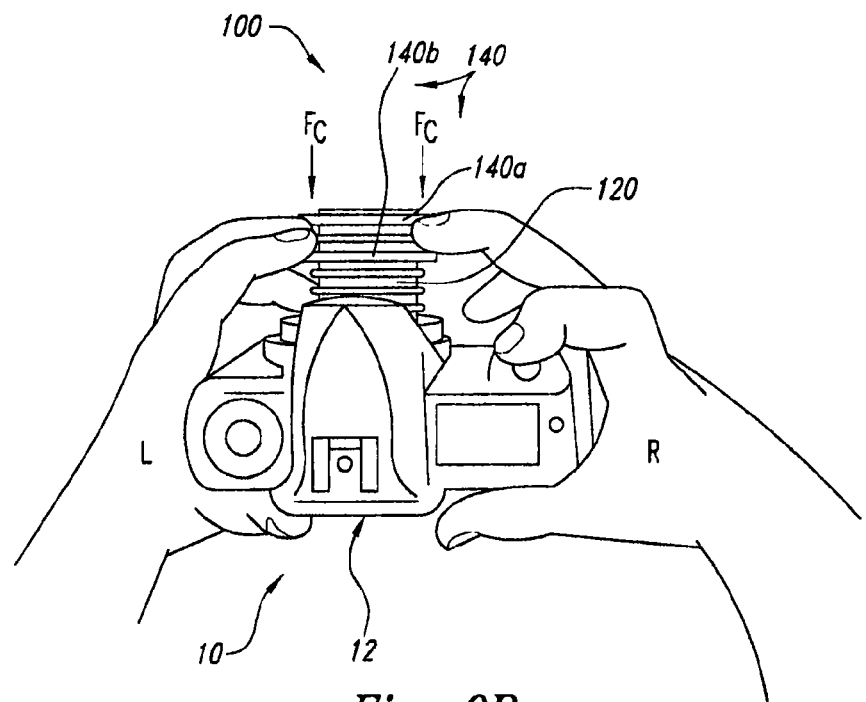
FIG. 9B is a partially schematic illustration of the camera system shown in FIG. 9A wherein at least a portion of the body is being compressed.

To facilitate focusing the camera, in certain embodiments, multiple focusing collars 140 can be coupled to the lens body 120. For example, the camera system 10 in FIG. 9A includes a lens system 100 having a flexible body 120 with two focusing collars 140, shown as a first focusing collar 140a and a second focusing collar 140b. Other arrangements can have more or fewer focusing collars 140. When the lens system 100 is attached to the camera 12 the focusing collars 140 can be used by an operator to manipulate the lens body to focus the camera system. For example, as shown in FIG. 9B, the operator can apply a compressing force (shown as $F_C$) to both sides of the second focusing collar 140b with the bottoms of the operator's fingers to compress at least a portion of the lens body 120 to focus the camera system 10. Similarly, the operator can apply an extending force (opposite the compressing force) to both sides of the first focusing collar 140a with the tops of the operator's fingers to extend at least a portion of the lens body 120.

Figure 9C:
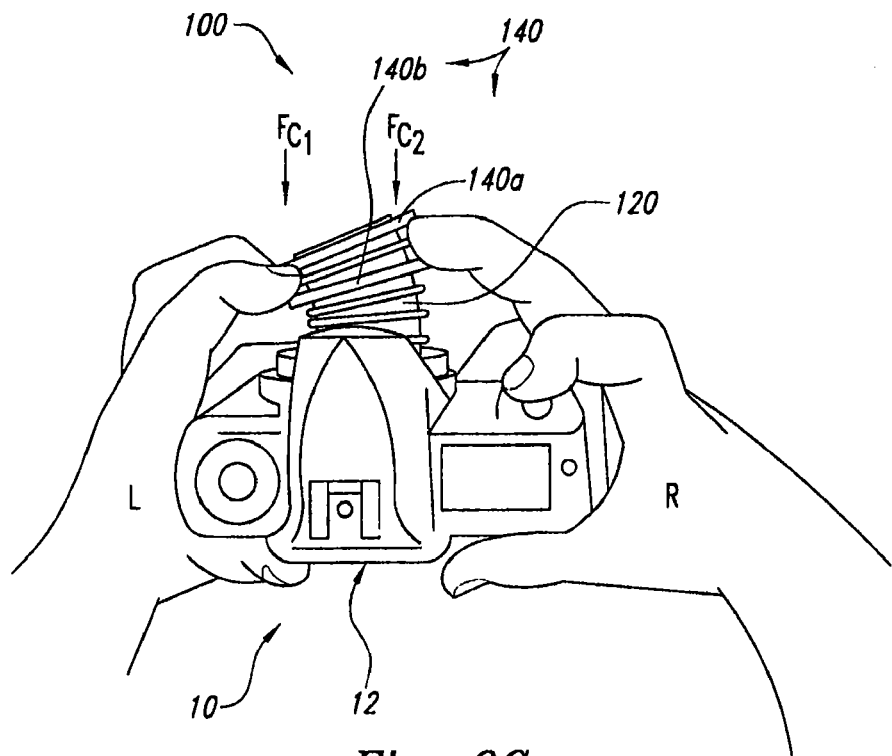
FIG. 9C is a partially schematic illustration of the camera system shown in FIG. 9A wherein at least a portion of the body is being compressed and the body is being bent to one side.
Figure 9D:
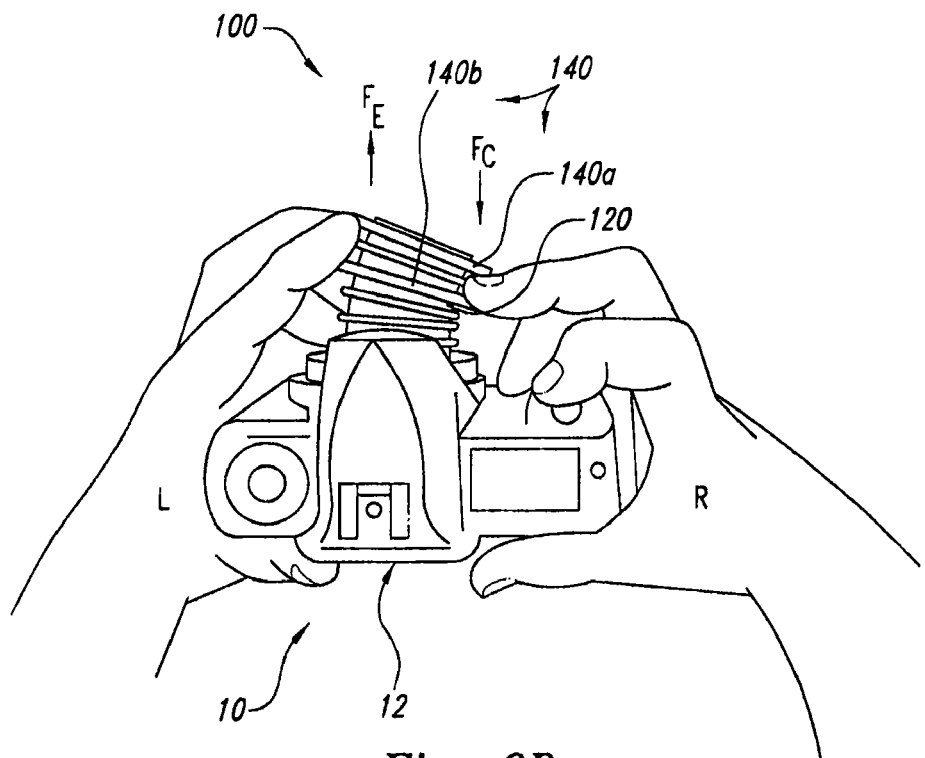
FIG. 9D is a partially schematic illustration of the camera system shown in FIG. 9A wherein an operator is bending the body to one side by applying an extending force to a first focusing collar and a compressing force to a second focusing collar.

As shown in FIG. 9C, the operator can also bend the body 120 by applying a compressing force (shown as $F_{C_1}$) to one side (e.g., the left side) of the second focusing collar 140b with the bottom(s) of the operator's finger(s) and a lesser compressing force (shown as $F_{C2}$) to the other side (e.g., the right side) of the second focusing collar 140b to compress at least a portion of the lens body 120. This will have the effect of compressing and bending one or more portions of the body 120 and can move the lens 134 (not shown in FIG. 9C) toward the camera 12 and tilt the lens 134 relative to the camera 12 (or the associated image capture plane) to achieve a desired focusing effect. As shown in FIG. 9D, the operator can also apply an extending force (shown as $F_E$) to the first focusing collar 140a with the top(s) of the operator's finger(s) and a compressing force (shown as $F_E$) to the second focusing collar 140b to bend the lens body 120 and focus the camera system 10. It will be recognized that these combinations of compressing, extending, and/or bending the body 120 have been provided for illustrative purposes only and that various other combinations can be used. For example, an operator can also apply an extending force to one side of the first focusing collar 140a and a lesser extending force to another side of the first focusing collar 140a to move the lens 134 (not shown) away from the camera 12 and to tilt the lens 134 relative to the camera 12 (or image capture plane) to achieve a desired focusing effect.

As discussed above, these focusing features (e.g., compressing, extending, and/or bending the body 120) can allow the photographer to achieve two effects: (1) controlling a 'sweet spot' within the picture plane where the image is in sharp focus, with surrounding areas of the image at the same depth of field remaining less sharp or blurred; and (2) photographing a horizontal surface (e.g., a flat horizontal surface) from an oblique point of view, effectively making the whole of that surface the principal plane of sharp focus. The benefit of the sweet-spot focusing effect is to allow the photographer to heighten the interest in a particular area of the photo and increase creative interest, without the time and effort of using image-processing software, such as Adobe® Photoshop®. Additionally, the sweet-spot focusing effect can allow a photographer to add real-time creativity to photographs and/or achieve results that would be difficult or impossible to achieve after the fact with image-processing software. The benefit of the tilt focusing effect is to allow a plane that is in an oblique angle to the image capture surface to be entirely in focus rather than just partly in focus, without resorting to very low f-stops which actually decrease the amount of light and therefore increase the risk of undesired blurring. Another benefit of certain embodiments described above is that methods of adjusting the 'sweet spot' of focus or the tilt of the lens 134 allows a much more fluid and continuously adjustable arrangement of the photo, enabling more spontaneous shots and more creative, photojournalistic-style compositions than are possible using traditional tilt-shift lenses that take a long time to properly align and/or using image-processing software.

Figure 10:
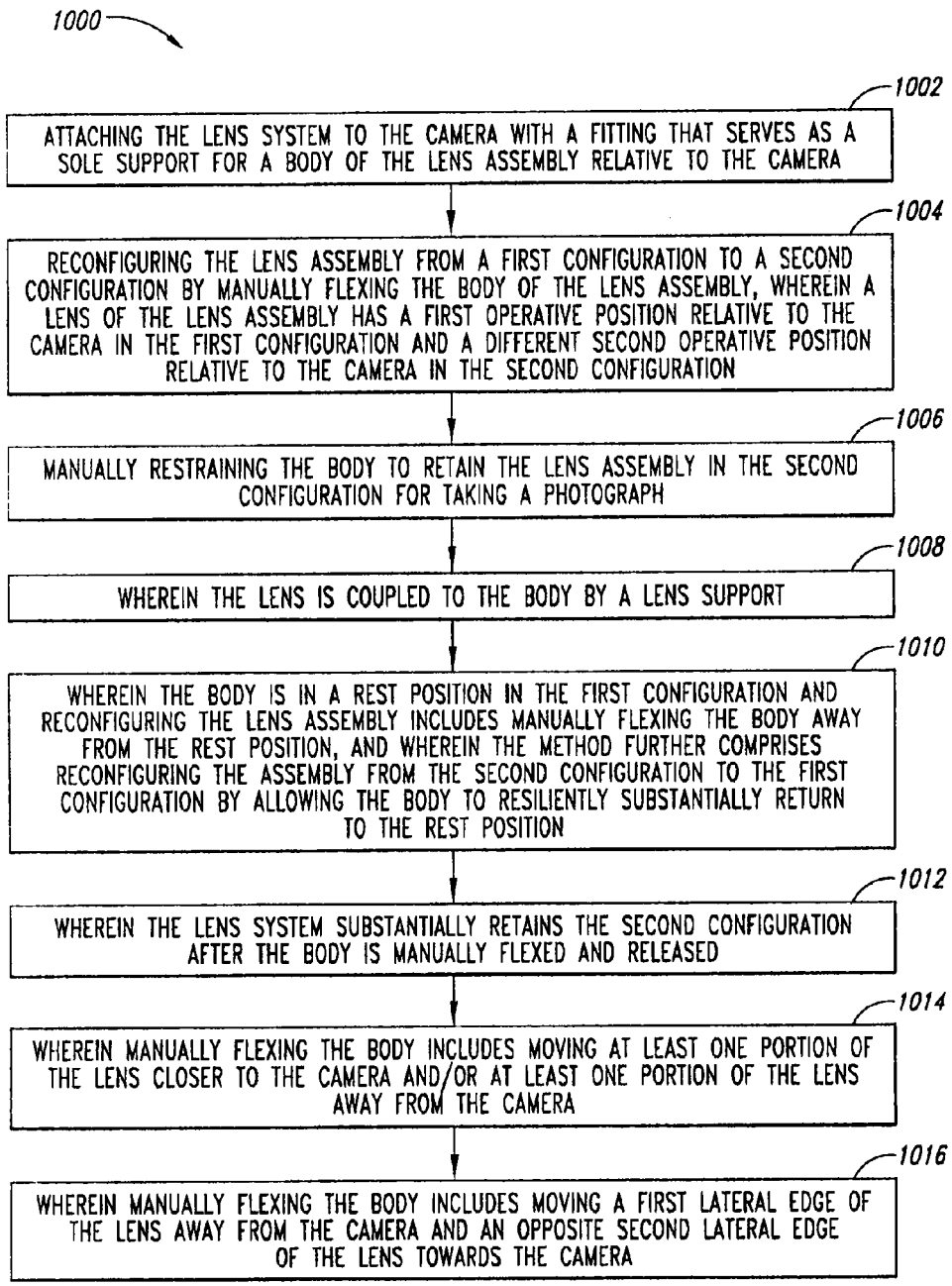
FIG. 10 is a chart containing process portions for a method of adjusting focus of a camera using a lens assembly in accordance with an embodiment of the invention.
Figure 11:
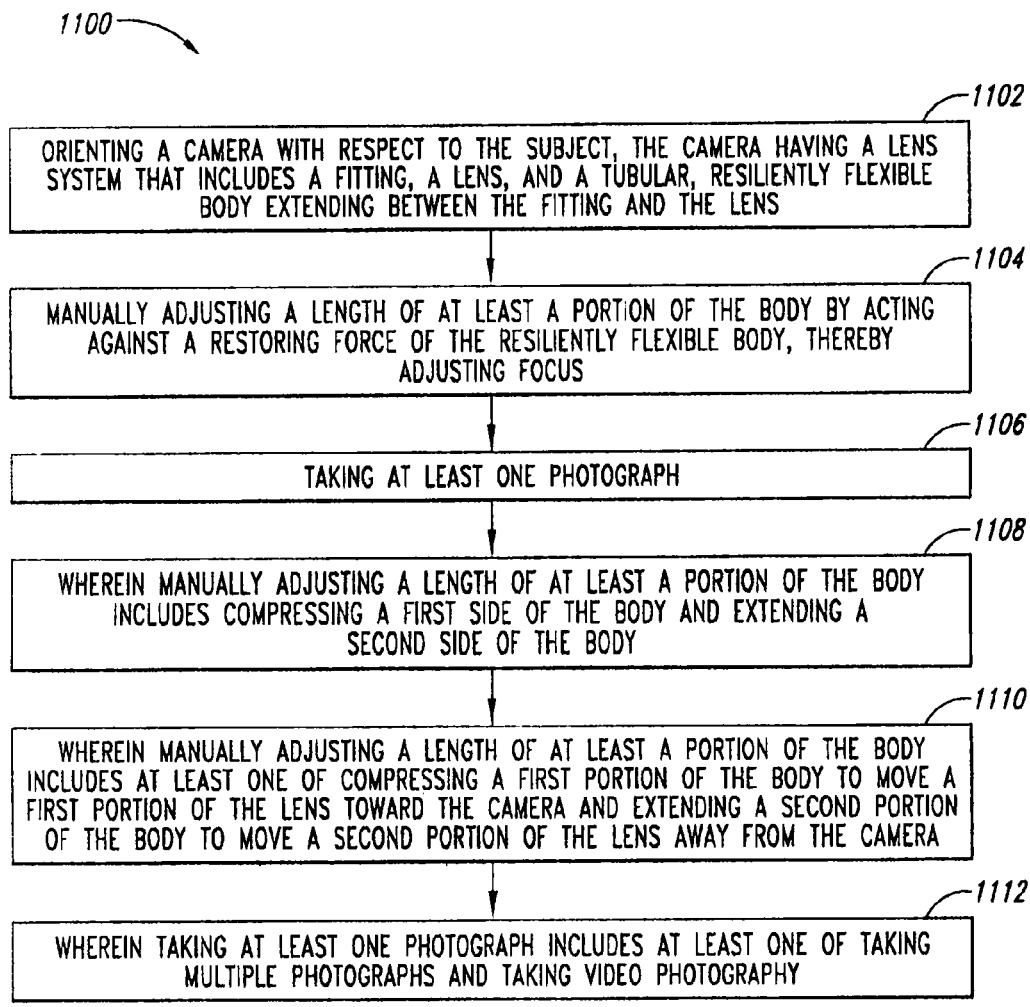
FIG. 11 is a chart containing process portions for a method of adjusting focus of a camera using a lens assembly in accordance with another embodiment of the invention.

Accordingly, FIG. 10 includes various method steps for adjusting focus of a camera in accordance with embodiments of the invention and FIG. 11 includes various method steps for photographing a subject in accordance with embodiments of the invention. In FIG. 10, a method for adjusting focus of a camera using a lens assembly 1000 can include attaching the lens system to the camera with a fitting that serves as a sole support for a body of the lens assembly relative to the camera (process portion 1002). The process can further include reconfiguring the lens assembly from a first configuration to a second configuration by manually flexing the body of the lens assembly (process portion 1004). A lens of the lens assembly can have a first operative position relative to the camera in the first configuration and a different second operative position relative to the camera in the second configuration (process portion 1004).

In certain embodiments, the method can further include manually restraining the body to retain the lens assembly in the second configuration for taking a photograph (process portion 1006). In other embodiments the lens can be coupled to the body by a lens support (process portion 1008). In still other embodiments, the body can be in a rest position in the first configuration and reconfiguring the lens assembly can include manually flexing the body away from the rest position (process portion 1010). The method can further include reconfiguring the assembly from the second configuration to the first configuration by allowing the body to resiliently substantially return to the rest position (process portion 1010). In yet another embodiment, the lens system can substantially retain the second configuration after the body is manually flexed and released (process portion 1012). Still further embodiments, manually flexing the body can include moving at least one portion of the lens closer to the camera and/or at least one portion of the lens away from the camera (process portion 1014). In yet another embodiment, manually flexing the body can include moving a first lateral edge or portion of the lens away from the camera and an opposite second lateral edge or portion of the lens towards the camera (process portion 1016).

In FIG. 11, a method for photographing a subject 1100 can include orienting a camera with respect to the subject (process portion 1102). The camera can have a lens system that includes a fitting, a lens, and a tubular, resiliently flexible body extending between the fitting and the lens (process portion 1102). The method can further include manually adjusting a length of at least a portion of the body by acting against a restoring force of the resiliently flexible body, thereby adjusting focus (process portion 1104). The method can still further include taking at least one photograph (process portion 1106).

In certain embodiments, manually adjusting a length of at least a portion of the body can include compressing a first side or portion of the body and extending a second side or portion of the body (process portion 1108). In other embodiments, manually adjusting a length of at least a portion of the body includes at least one of compressing a first portion of the body to move a first portion of the lens toward the camera and extending a second portion of the body to move a second portion of the lens away from the camera (process portion 1110). In still other embodiments, taking at least one photograph can include at least one of taking multiple photographs and taking video photography (process portion 1112).

A feature of certain embodiments described above is that a lens system with a fluidly and rapidly adjustable focus can be provided. Additionally, the lens can be inexpensive, light weight, and intuitive and easy to use. An advantage of this feature is that it can provide a photographer with the ability to rapidly take a series of photographs and to vary the images in an aesthetically pleasing manner. This can be advantageous to any type of camera system.

Digital photography has become increasingly popular in recent years, with sales of digital single lens reflex camera increasing 100% in 2002 and digital camera sales eclipsing film camera sales in 2003. Aspects of digital photography are significantly different from film photography. For example, single lens reflex digital cameras can offer nearly immediate feedback on the quality of a photograph just taken by displaying the image in a liquid crystal display on the camera body 12. This gives photographers using digital single reflex cameras very fast feedback on the look of a photograph before any developing expense has occurred, dramatically reducing the time and expense necessary to see a photographic image. Lens systems in accordance with certain embodiments described above can be well suited to allow digital camera users to take advantage of these digital camera features by allowing a photographer to experiment with a composition by taking a series of shots over a short period of time until finding an aesthetically pleasing result.

D. Lens Systems with Retention Devices and/or Lens Tilt Actuator(s)

The focusing features (e.g., compressing, extending, and/or bending the body of the lens system) of embodiments of the invention discussed above with reference to FIGS. 1-11 and discussed in International Patent Application No. PCT/US2004/033141, International Publication No. WO 2005/036249, entitled FLEXIBLE LENS MOUNT SYSTEM FOR RAPID TILT PHOTOGRAPHY, filed 7 Oct. 2004, which is fully incorporated herein by reference, can allow the photographer to achieve various desired focusing effects. However, in many of the embodiments discussed above the photographer must manually retain the lens body in the desired position while taking a photograph. In some embodiments of the invention, it can be desirable for the lens system to include a retention device configured to retain the body of the lens system and/or the lens in a user selected position once the user has focused the lens system/camera to achieve the desired focusing effect. In further embodiments of the invention, it can be desirable for the retention device to include an adjusting mechanism that allows the user to further adjust the focus of the camera/lens system while the retention device is retaining the body of the lens system and/or the lens in the user selected position.

Figure 12:
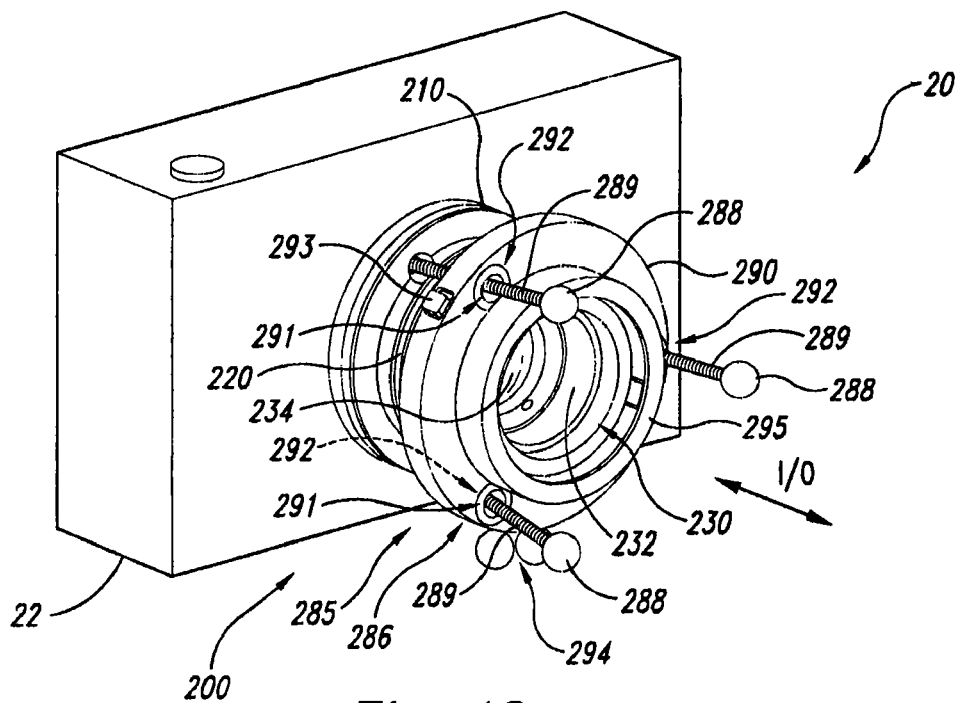
FIG. 12 is an isometric illustration of a camera system with a lens system having a retention device in accordance with certain embodiments of the invention.
Figure 13:
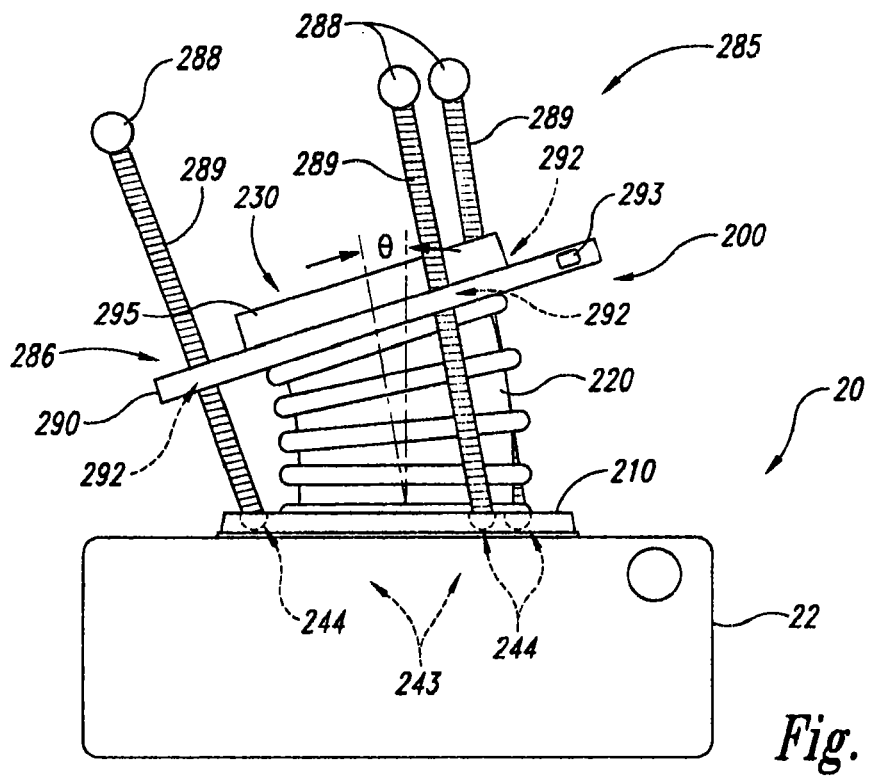
FIG. 13 is a partially schematic top plan view illustration of the camera system shown in FIG. 12 wherein a portion of a body of the lens system has been positioned to achieve a desired focusing effect.

FIG. 12 is an isometric illustration of a camera system 20 with a lens system 200 having a retention device 285 in accordance with certain embodiments of the invention. In FIG. 12, the camera system 20 includes a camera 22 similar to the camera 12 discussed above with reference to FIGS. 1-11. Additionally, the lens system 200 in FIG. 12 includes a flexible body 220 extending between a fitting 210 or mount and a lens assembly 230 that includes a lens support 232 and a lens 234, similar to the body, fitting, lens assembly, lens support, and lens discussed above with reference to FIGS. 1-11. Accordingly, as shown in FIG. 13, portions of the body 220 of the lens system 200 can be compressed, extended, and/or bent to provide focusing effects similar to those discussed above with reference to FIGS. 1-11.

Figure 14:
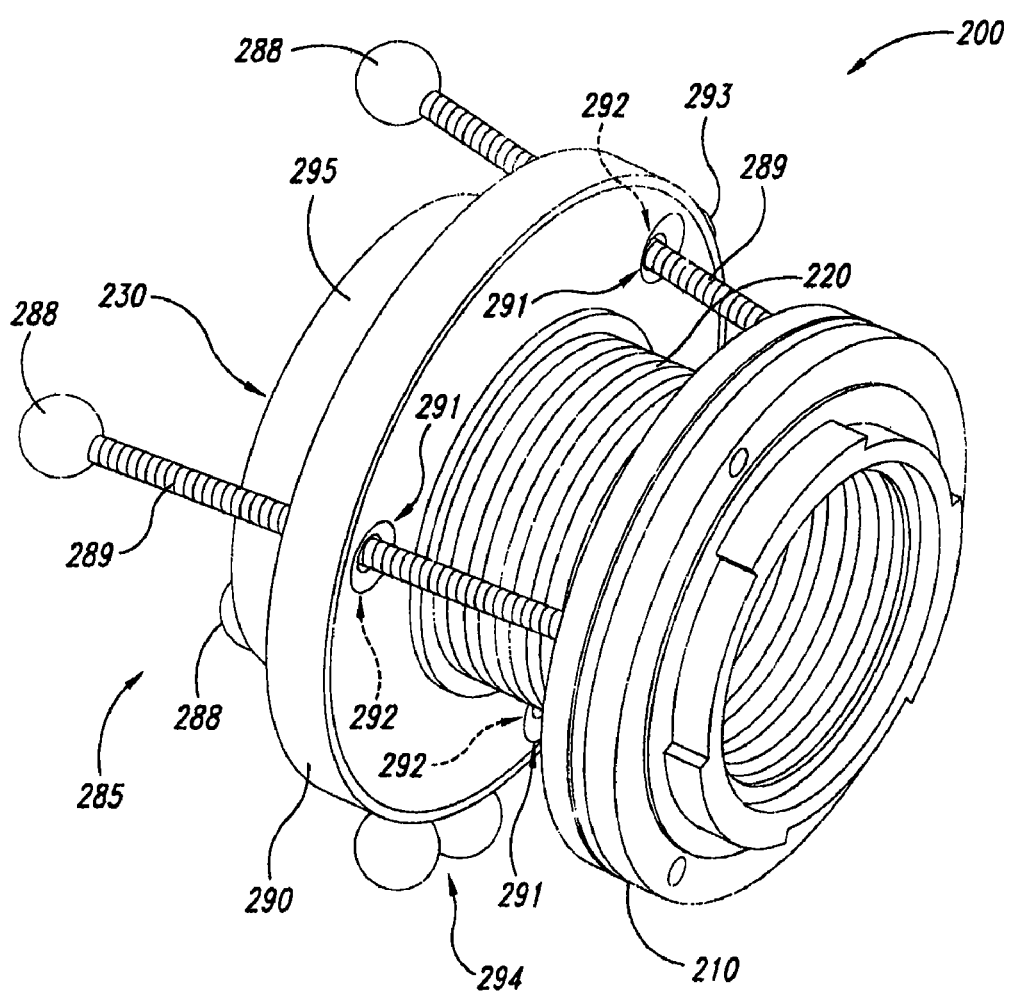
FIG. 14 is an isometric illustration of the lens system shown in FIG. 12.

In other embodiments, the lens system can have other configurations. For example, in certain configurations the body 220 of the lens system 200 is not flexible and/or resilient, but includes at least one movable portion that allows the lens 234 to be moved among at least two operative positions relative to the camera 22 when the fitting is coupled to the camera 22. For example, in selected embodiments a portion of the body 220 can include a telescoping section that allows the lens 234 to move toward and away from the camera 22. In other embodiments, the body 220 can include a ball and socket chain arrangement that allows the body 220 to tilt relative to the camera 22, thereby tilting the lens 234. Although in the illustrated embodiment the lens system is mountable or attachable to the camera and detachable (as shown in FIG. 14) via the fitting 210, in other embodiments the lens system can be permanently coupled to the camera and/or coupled to the camera via other structures (e.g., via an optical device such as a filter or the like).

The lens system 200 shown in FIG. 12 includes a retention device 285 coupled to the body 220 and the fitting 210 and/or camera 22. As discussed below in greater detail, the retention device in the illustrated embodiment has an engaged configuration and a disengaged configuration which can be selected by a user. In the engaged configuration the retention device 285 retains at least a portion of the body 220 in at least one user selected position and in the disengaged configuration the retention device 285 does not retain the at least a portion of the body 220 in the at least one user selected position.

For example, in the disengaged position the retention device allows a user (e.g., operator or photographer) to position the lens 234 and/or the body of the lens system 220 among two or more user selectable positions (e.g., through a range of user selectable positions). In selected embodiments, the user positions the lens 234 by grasping a portion of the body 220, a portion of the collar 290, or a portion of another structure coupled to the lens 234 and manually moving the lens 234/body 220 into the desired user selected position (e.g., focusing the camera 22/lens system 200 to achieve a desired focusing effect). Once the user has moved the lens to the at least one user selected position, the retention device 285 can be engaged or moved to the engaged configuration where the retention device 285 retains the lens 234/body 220 in the user selected position. The retention device can be subsequently disengaged (e.g., released or moved to the disengaged configuration) to allow the user to manually move the lens 234/body 220 (e.g., by grasping a portion of the body 220, a portion of the collar 290, or a portion of another structure coupled to the lens 234 and manually positioning the lens 234/body 220).

In the illustrated embodiment, the retention device 285 includes a collar or frame section and at least one shaft 288 or support extending between the fitting 210 and the collar 290. The collar includes a corresponding hole 291 or receptacle for receiving each of the shafts 288. In FIG. 12 the retention device 285 includes three round shafts 288 and three round holes 291, however, in other embodiments the retention device 285 can include more, fewer, or different types of supports and receptacles (e.g., supports having a rectangular cross-section and receptacles with a rectangular cross-section). Additionally, in other embodiments the frame section can include other configurations (e.g., a square structure).

In FIGS. 12-14, when the retention device 285 is in the disengaged configuration the holes 291 in the collar 290 slide over their respective shafts 288 as the lens 234/body 220 are positioned among multiple user selected positions (e.g., without use of the retention device and with little or no interference from the retention device). As shown in FIG. 13, the shafts 288 can be pivotally coupled to the fitting 210/camera 22 so that the shafts 288 can pivot as the lens 234/body 220 is moved, allowing the lens 234 to be tilted by moving at least a portion of the body 220 (e.g., by compressing, extending, and/or bending a portion of the body 220). For example, in FIG. 13 the end portions of the shafts 288 that engaged the fitting 210 include pivoting devices 244 (e.g., pivoting balls) that are retained in corresponding receiving devices 243 (e.g., cavities) of the fitting 210 allowing the shafts 288 to pivot independently. Once the user has moved the lens 234/body 220 to a user selected position, the user can use an engagement control 293 to engage the retention device 285 so that the retention device 285 will retain the lens 234/body 220 in the user selected position.

Figure 15:
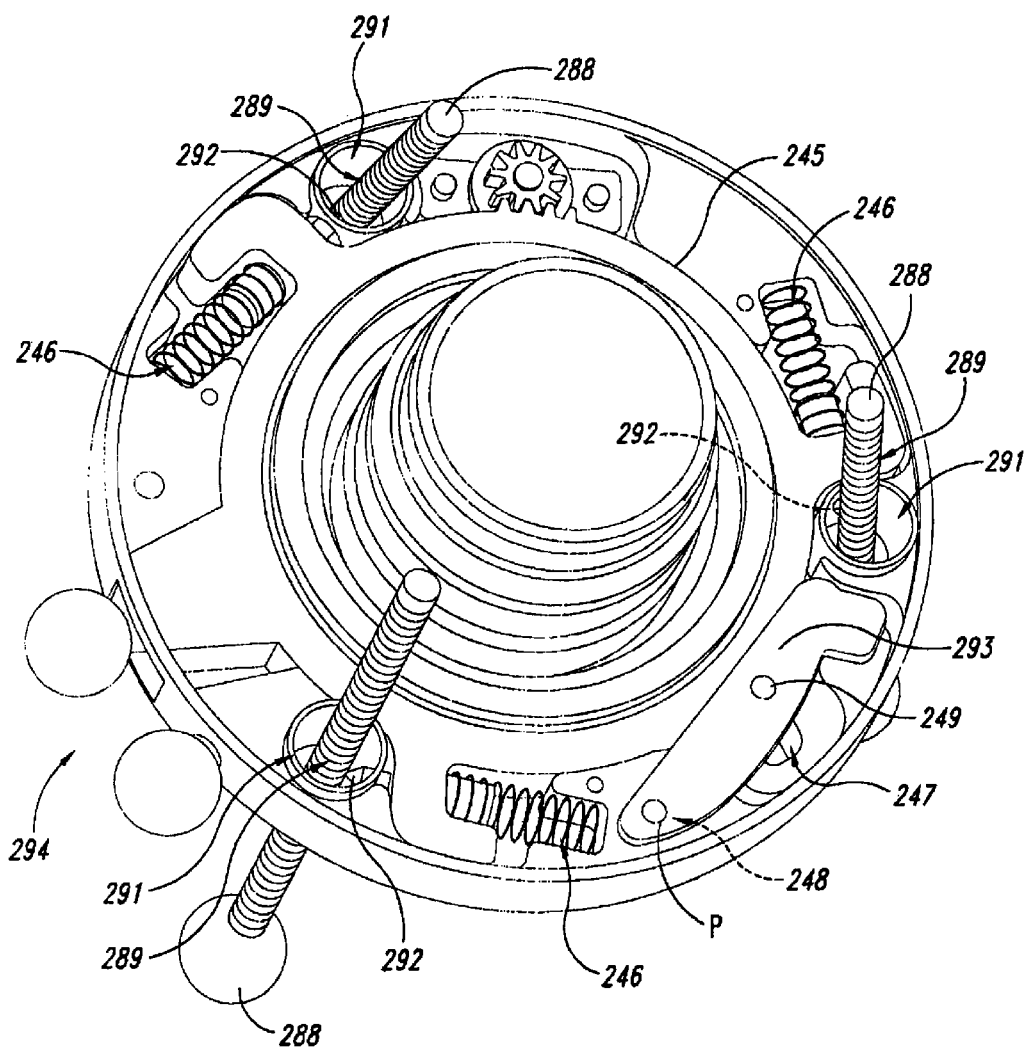
FIG. 15 is an isometric cross-sectional illustration of a portion of a collar of the lens system shown in FIG. 12 when the retention device is in the engaged position.

FIG. 15 is an isometric cross-sectional illustration of a portion of a collar 290 of the lens system 200 shown in FIG. 12 with the retention device 285 in the engaged configuration. In FIG. 15, the shafts 288 include engagement sections 289

(e.g., ridges, threads, or the like) configured and positioned to be engaged by engagement devices 292 positioned in each of the holes 291. For example, in the illustrated embodiment the engagement devices 292 include pins for engaging threads on the shafts 288. In the illustrated embodiment, the pins can engage the threads of the shafts 288 and press the shafts 288 against the side of the holes 291, preventing the holes 291 and shafts 288 from sliding relative to one another, thereby retaining the lens 234/body 220 in the position selected by the user at the time of engagement.

In FIG. 15, the engagement devices 292 are coupled to a retention ring 245 which is rotatably positioned in or on the collar 290. Urging devices or engagement springs 246 are positioned to urge the retention ring 245 to rotate in a clockwise direction (as viewed in FIG. 15) until the engagement devices 292 engage the engagement sections 289. Additionally, once the retention device is placed in the engaged configuration, the engagement springs are configured and positioned to retain engagement between the engagement devices 292 and the engagement sections 289 until the user moves the retention device 285 to the disengaged configuration using the release control 294.

In the illustrated embodiment, the engagement control 293 includes a lever portion with a button or protrusion that extends through the side of the collar 290 when the retention device is in the disengaged position. The user can press the button toward the collar, thereby pivoting the lever portion about point or shaft P. As the button moves towards and/or into the collar 290 and the lever portion rotates, the retention ring 245 and the engagement devices 292 move to the position shown in FIG. 15, wherein the retention device is in the engaged position.

Figure 16:
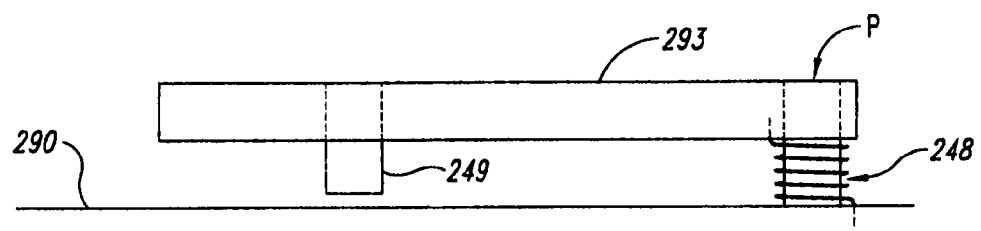
FIG. 16 is a partially schematic side elevation of an engagement control of the lens system shown in FIG. 12.
Figure 17:
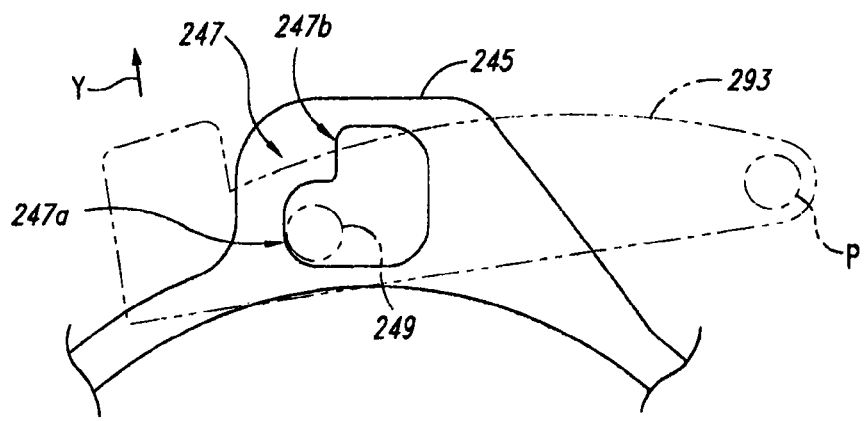
FIG. 17 is a partially schematic cross-sectional top plan view of a portion of a retention ring of the lens system shown in FIG. 12 with the retention device in the engaged position.

FIG. 16 is a partially schematic side elevation of an engagement control 293 of the lens system 200 shown in FIG. 12 viewed from the center of the engagement ring 245. FIG. 17 is a partially schematic top plan view of a portion of a retention ring 245 proximate to the engagement control 293 with the retention device 285 in the engaged position and with the engagement control 293 shown in ghosted lines. As shown in FIG. 16, in the illustrated embodiment the engagement control 293 includes an engagement control pin 249 and an engagement control spring or urging device 248 that urges the engagement control to return to the disengaged position with the button protruding out of the side of the collar 290 (e.g., to move in the direction of arrow Y in FIG. 17). However, as shown in FIG. 17, when the retention device is in the engaged position, the engagement control pin 249 is positioned in a first detent portion 247*a* of a detent section 247 of the retention ring 245. In the first detent portion 247*a* the engagement control spring 248 does not produce enough force to overcome the engagement springs 246 (shown in FIG. 15) and move the retention ring 245 in the counterclockwise direction. Accordingly, the retention device 285 remains in the engaged configuration until a user moves the retention device 285 to the disengaged position using the release control.

Figure 18:
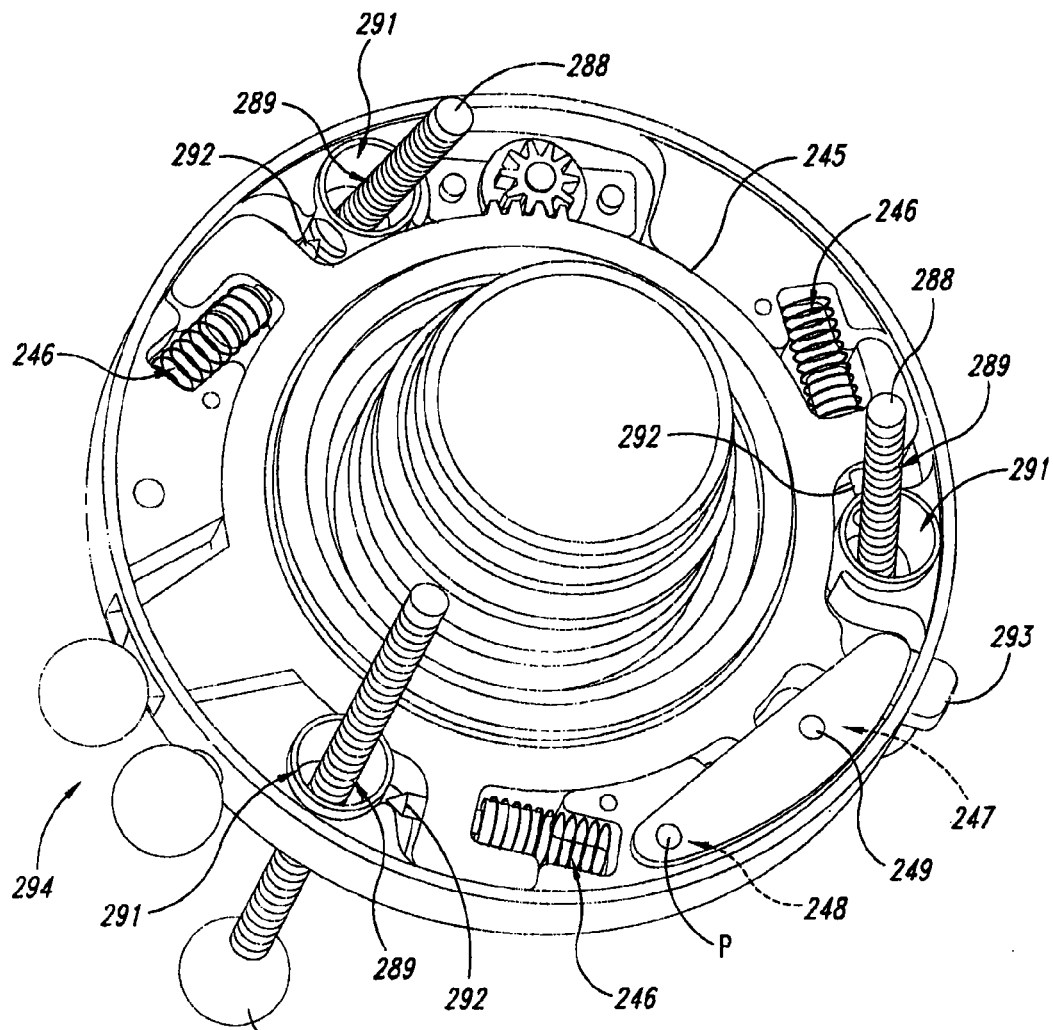
FIG. 18 is an isometric cross-sectional illustration of a portion of a collar of the lens system shown in FIG. 12 when the retention device is in the disengaged position.

FIG. 18 is an isometric cross-sectional illustration of a portion of a collar of the lens system shown in FIG. 12 when the retention device is in the disengaged position. In FIG. 18, the release control 294 includes knobs or other gripping devices that allow a user to move the retention ring 245 in a counterclockwise direction (as viewed in FIG. 18) by squeezing or moving the knobs toward one another. As a retention ring 245 is moved in the counterclockwise direction, the engagement springs are compressed and the engagement devices 292 are moved away and disengaged from the engagement sections 289 so that the shafts 288 can slide through the holes 291. Additionally, as the retention ring 245 moves in the counterclockwise direction, the engagement control 293 is allowed to pivot about point P so that the engagement control pin 249 can be urged toward a second detent portion 247*b* of the detent section 247 by the engagement control urging device 248.

Figure 19:
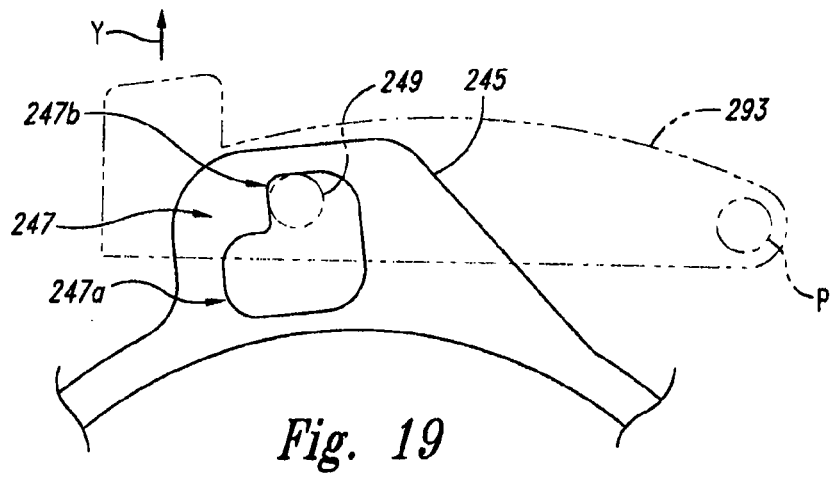
FIG. 19 is a partially schematic cross-sectional top plan view of a portion of a retention ring of the lens system shown in FIG. 12 with the retention device in the disengaged position.

FIG. 19 is a partially schematic cross-sectional top plan view of a portion of a retention ring 245 proximate to the engagement control 293 with the retention device 285 in the disengaged position and the engagement control 293 shown in ghosted lines. In FIG. 19, the button portion of the engagement control 293 has moved in the direction of arrow Y and the engagement control pin 249 has engaged the second portion 247*b* of the detent section 247. The engagement springs 246 (shown in FIG. 18) urge the retention ring 245 to move in the clockwise direction, but the engagement control pin 249 prevents movement of the retention ring 245. Accordingly, the retention device 285 remains in the disengaged position until a user presses the button portion of the engagement control 293 toward and/or into the collar 290, thereby moving the engagement pin 249 toward the first portion 247*a* of the detent section 247 and allowing the engagement springs 246 to move the retention ring 245 in the clockwise direction engaging the retention device 285.

As discussed above, in selected embodiments the retention device 285 includes an adjusting arrangement 286 that allows the user to adjust the position of the lens 234 and/or body 220 while the retention device 285 is in the engaged configuration. For example, the retention device 285 can adjustably retain the lens 234/body 220 in at least one user selected position and once the retention device 285 is engaged in a first user selected position, the adjusting arrangement 286 can allow the user to move the lens 234/body 220 from the first user selected position to a second user selected position while the retention device remains in the engaged configuration. This feature can be especially useful for allowing a user to quickly position the lens to a selected position, allowing the user to use a retention device to retain the lens in the selected position, and then allowing the user to make fine adjustments while the retention device remains engaged.

For example, in the illustrated embodiment the adjusting arrangement 286 can include the shafts 288 being both pivotal and rotatably coupled to the fitting 210 via the pivoting devices 244 and receiving devices 243 discussed above with reference to FIG. 13. Additionally, the engagement sections 289 of the shaft 288 can include threads and the engagement devices 292 can include pins. Accordingly, once the retention device 285 is engaged (e.g., the pins engage the threads of the shaft 288) a corresponding portion of the collar will move toward or away from the fitting 210 when one of the shafts 288 is rotated because the pin will move longitudinally along the threaded section of the shaft 288 (e.g., toward or away from the fitting 210). As the collar 290 moves, the lens 234/body 220 will move appropriately. This feature can allow the lens to be moved in or out while retaining a relative tilt orientation to the fitting 210/camera 22 by rotating each of the shafts 288 an appropriate amount (e.g., allow a user to adjust the "in/out" focus). Additionally, the tilt of the lens can be adjusted by rotating individual shaft(s) various amounts to achieve the desired tilt (e.g., adjusting the "tilt" focus).

Figure 21:
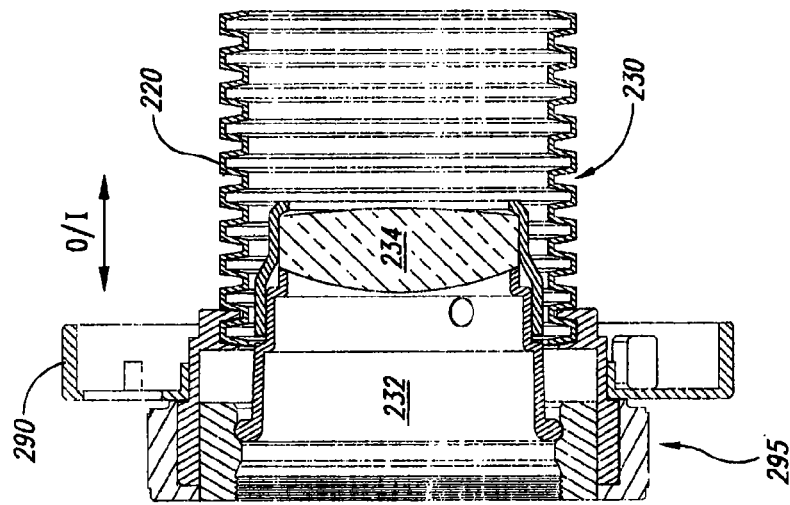
FIGS. 20 and 21 are partially schematic cross-sectional illustrations of a focus ring assembly and lens support of the lens system shown in FIG. 12.
Figure 20:
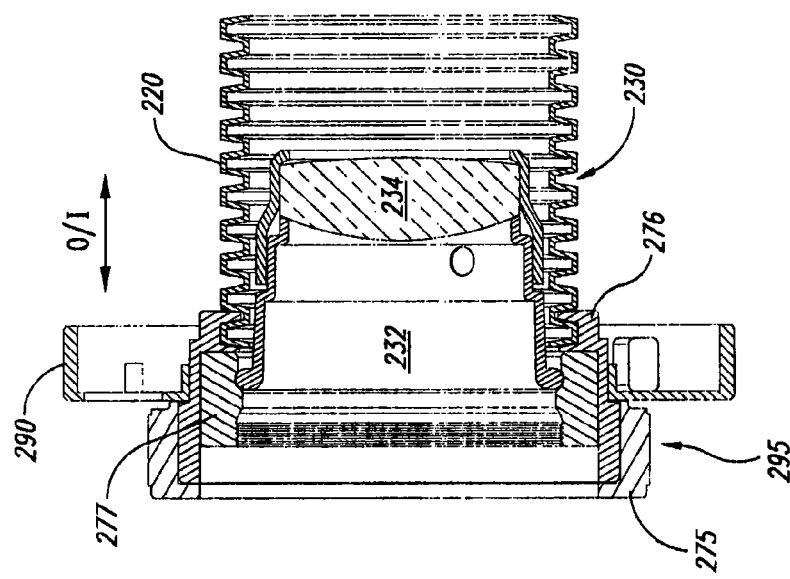

In other embodiments, the retention device 285 can have other arrangements and/or other adjustment methods. For example, in other embodiments the retention device 285 can have more or fewer shafts 288. In still other embodiments the lens system can include different and/or additional adjusting arrangement(s) 286, adjustment devices, or adjustment methods. For example, FIGS. 20 and 21 are partially schematic cross-sectional illustrations of a focus ring assembly 295 and the lens support 232 of the lens system shown in FIG. 12. The lens support 232, discussed above, carries at least one lens 234. In the illustrated embodiment, the focus ring assembly 295 can be configured to move the lens 234 in and out, as shown by arrows O/I relative to the camera and/or the fitting (shown in FIG. 12) regardless of the position of the body 220.

For example, in selected embodiments the focus ring assembly 295 is coupled to the collar 290 and the lens support 232 so that when the portion of the focus ring assembly 295 is rotated in a first direction the lens 234 moves at least approximately toward the fitting (even if the lens is tilted). When the portion of the focus ring assembly 295 is rotated in a second direction the lens 234 moves at least approximately away from the fitting. This feature can allow a user to make fine adjustments to the "in/out" focus while the retention device remains engaged without having to make adjustments to each individual shaft. FIG. 20 shows the lens support 232 and lens 234 positioned closer to the fitting or camera than the position of the lens support 232 and lens 234 shown in FIG. 21.

Figure 22:
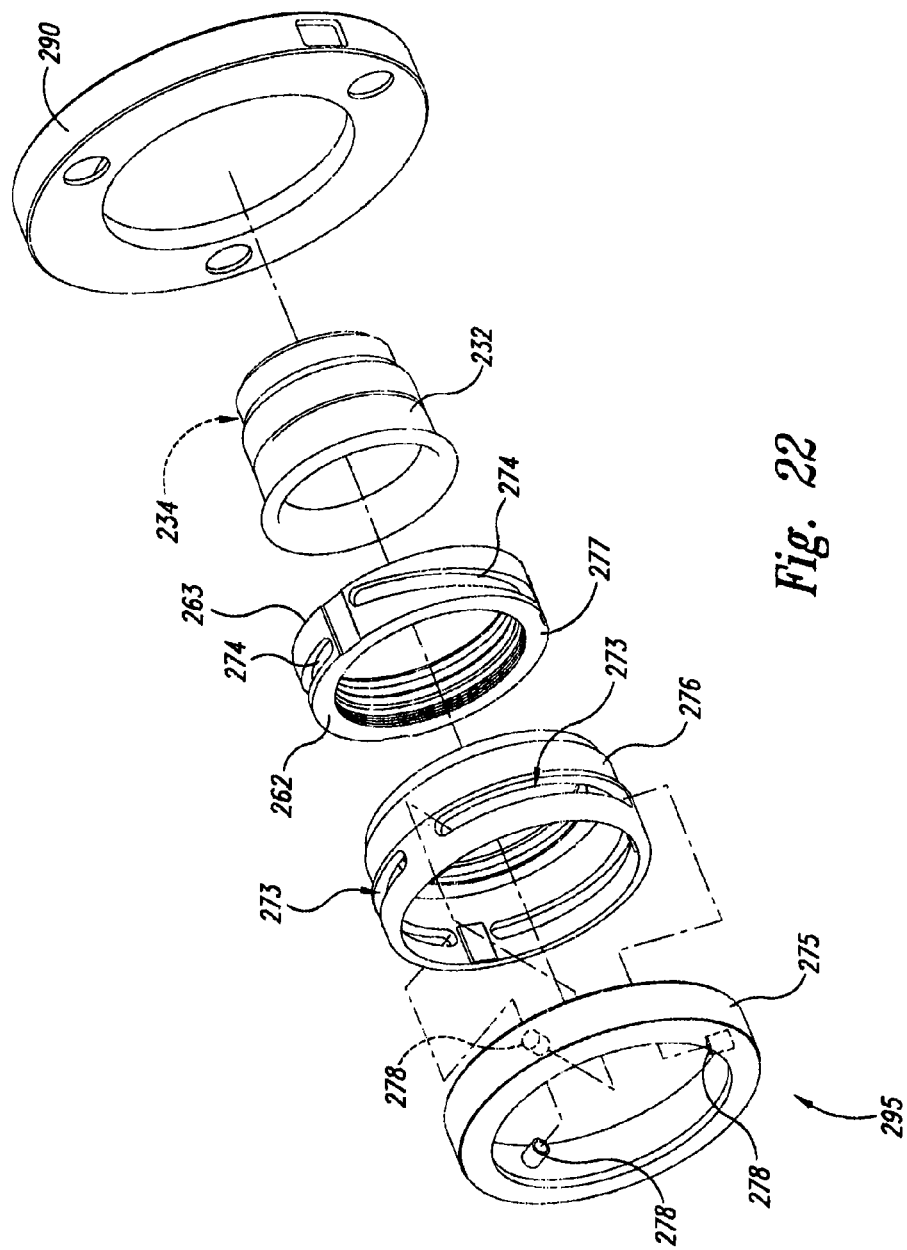
FIG. 22 is an exploded isometric illustration of the focus ring assembly and lens support of the lens system shown in FIG. 12.

FIG. 22 is an exploded isometric illustration of the focus ring assembly 295 and lens support 232 of the lens system shown in FIG. 12. The focus ring assembly includes an outer mechanism 276 that is coupled to the collar 290. The outer mechanism 276 includes horizontal slots 273 that run generally (e.g., at least approximately) parallel to the radial plane of the collar 290 when the outer mechanism 276 is coupled to the collar. The focus ring assembly 295 further includes an inner mechanism 277 that is positioned inside the outer mechanism 276. The inner mechanism 277 includes angled grooves 274 (e.g. angled between a first surface 262 of the inner mechanism 277 and a second surface 263 of the inner mechanism 277, and angled relative to the horizontal slots of the outer mechanism 276 when positioned inside the outer mechanism 276). The lens support 232 is coupled to the inner mechanism 277 so that as the inner mechanism moves toward and away from the fitting/camera the lens support 232 and lens 234 move toward and away from the fitting/camera, respectively.

In the illustrated embodiment, a grip 275 is positioned around the outer mechanism 276 and includes attached pins or bushings 278 that extend radially inward from the grip and extend through the horizontal slots 273 of the outer mechanism 276 and into (e.g., ride in) the angled grooves 274 of the inner mechanism 277. Accordingly, as the grip 275 is rotated the bushings 278 move in the horizontal slots 273 in the outer mechanism 276 and ride in the angled grooves 274 of the inner mechanism 277 causing the inner mechanism (and the lens support 232 coupled thereto) to move or translate toward and away from the fitting/camera.

Figure 22A:
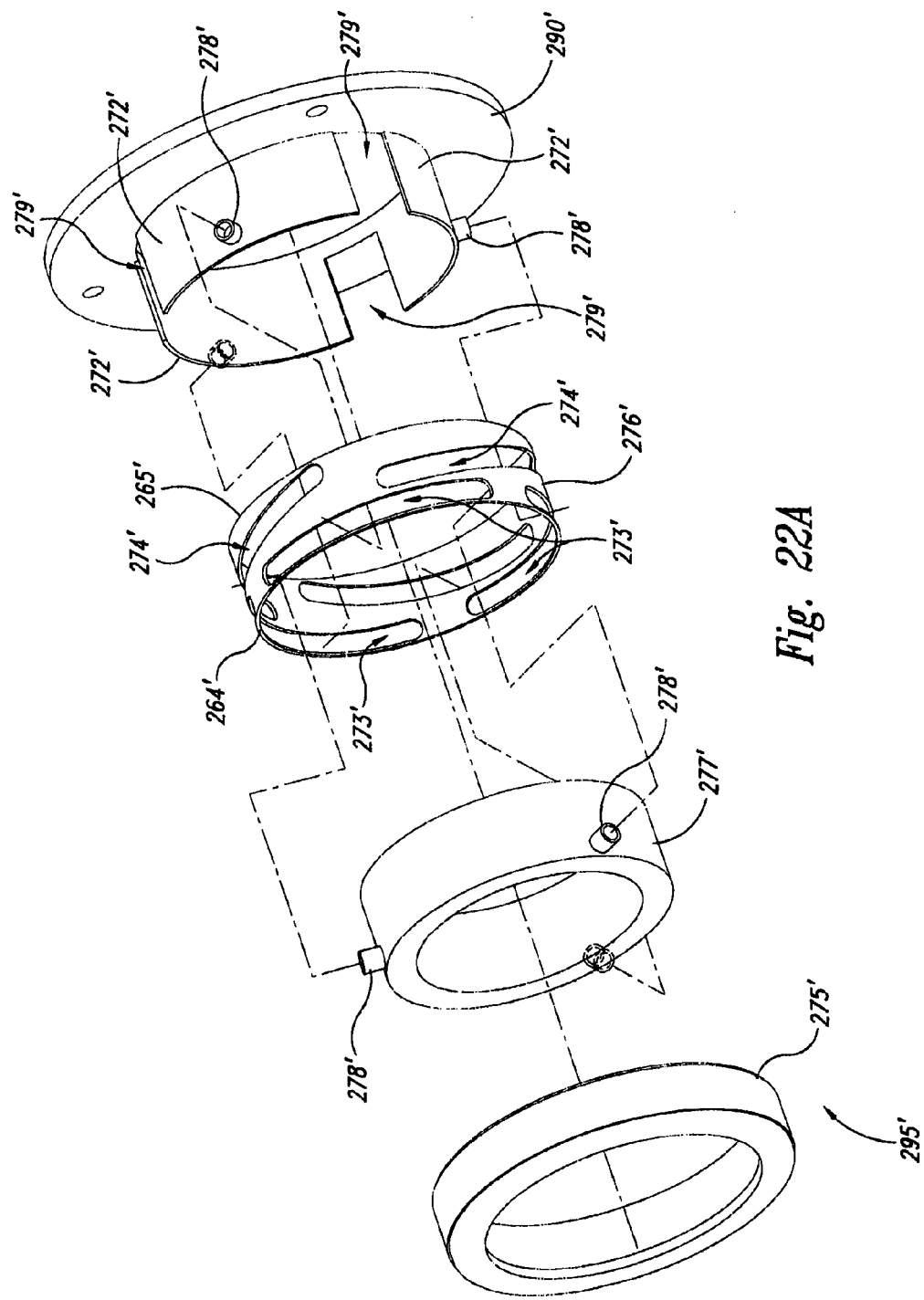
FIG. 22A is an exploded isometric illustration of a focus ring assembly of a lens system in accordance with another embodiment of the invention.

In other embodiments, the focus ring assembly 295 can have other arrangements. For example, FIG. 22A is an exploded isometric illustration of a focus ring assembly 295' of a lens system in accordance with another embodiment of the invention. In FIG. 22A, the collar 290' (that is configured to receive the shafts of the retention device) includes a raised flange section 272' positioned to extend away from the fitting/camera when the collar receives the shafts of the retention device. The raised flange section 272' includes slots 279' that are also positioned to extend away from the fitting/camera. The flange section 272' also carries pins or bushings 278' on an outer surface of the flange section 272'. The bushings 278' extend radially away from the outer surface of the flange section of the collar 290'.

In the illustrated embodiment, an outer mechanism 276' is positioned around the flange section 272' of the collar 290'. The outer mechanism 276' includes horizontal slots 273' and angled slots 274'. The horizontal slots 273' are generally (e.g., at least approximately) parallel to a first surface 264' and a second surface 265' of the outer mechanism 276'. The angle slots are angled between the first surface 264' and the second surface 265' of the outer mechanism 276', and angled relative to the horizontal slots 273'. When the outer mechanism 276' is positioned around the flange section 272' of the collar 290', the bushings 278' carried by the flange section 272' extend into or through the horizontal slots 273' of the outer mechanism 290' so that each bushings 278' slides in its corresponding horizontal slot 273' as the outer mechanism 276' is rotated clockwise and counterclockwise relative to the flange section 272'.

In FIG. 22A, an inner mechanism 277' is configured to be coupled to the lens support 232 and lens 234 shown in FIG. 22 so that as the inner mechanism 277' moves toward and away from a fitting/camera the lens support 232 and lens 234 move toward and away from the fitting/camera. The inner mechanism 277' includes pins or bushings 278' on an outer surface of the inner mechanism 277'. The bushings extend radially outward from the outer surface of the inner mechanism 277'.

In the illustrated embodiment, the inner mechanism 277' is positioned inside the flange section 272' so that the bushings 278' of the inner mechanism 277' extend through the slots 279' in the flange section 272' and into or through the angled slots 274' of the outer mechanism 276'. Accordingly, as the outer mechanism 276' is rotated clockwise and counterclockwise, the angled slots 274' of the outer mechanism 276' move relative to the bushings 278' of the inner mechanism 277'. As the angled slots 274' move relative to the bushings 278' of the inner mechanism 277', the bushings 278' of the inner mechanism 277' are prevented from rotating a substantial amount by the slots 279' in the collar 290'. Accordingly, the bushings 278' of the inner mechanism 277' move in the slots 279' of the collar 290' toward and away from a fitting/camera as the outer mechanism 276' (and the angled slots 274' of the outer mechanism 276') are rotated clockwise and counterclockwise. As the bushings 278' of the inner mechanism 277' move toward and away from the fitting/camera, the inner mechanism 277' and the lens support 232/lens 234 also move toward and away from the fitting/camera, for example, providing a user with a fine focus feature while the retention device is engaged. In the illustrated embodiment, a grip 275' is coupled to the outside of the outer mechanism 276' to aid a user in rotating the outer mechanism 276'.

Figure 22B:
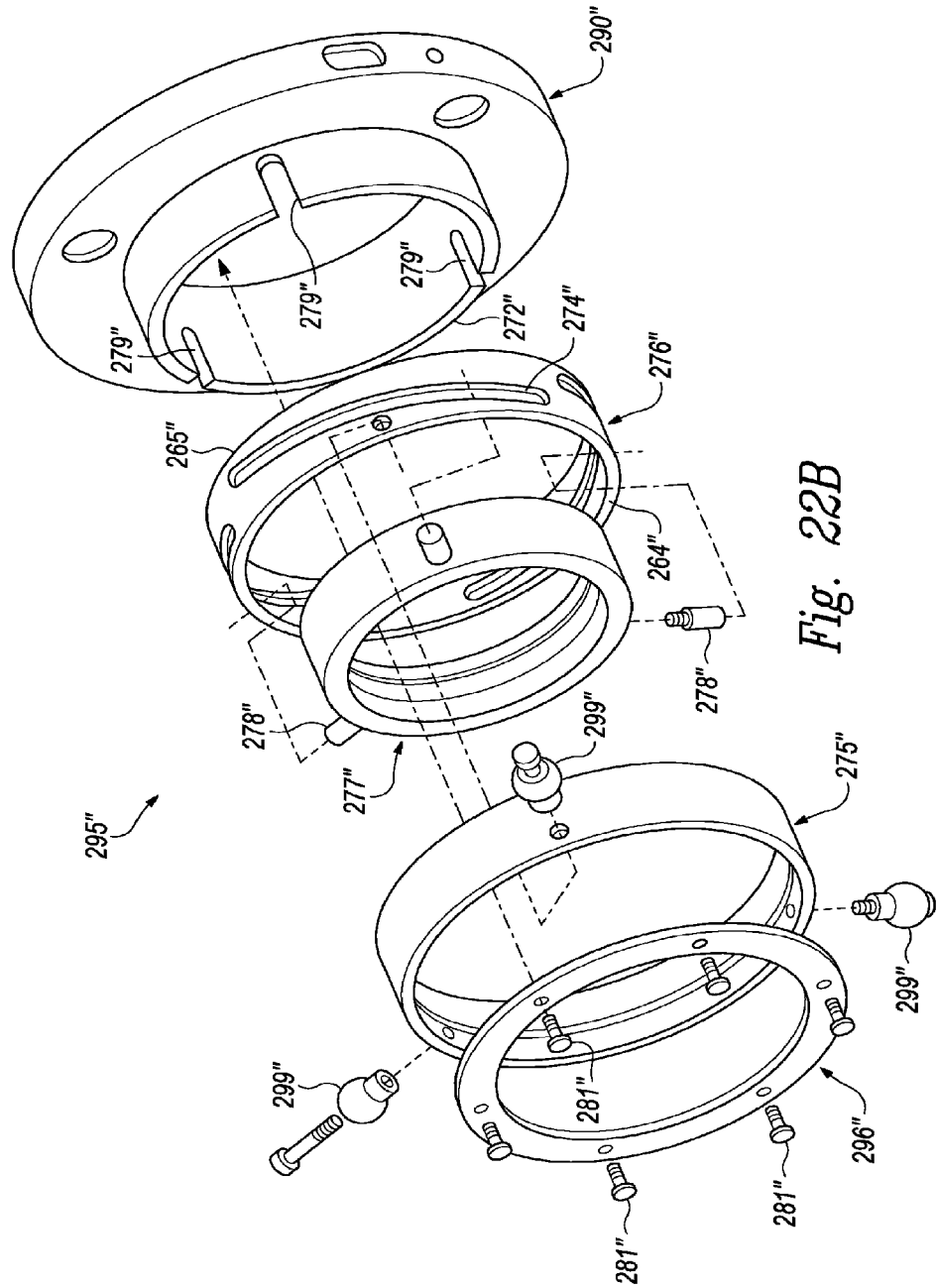
FIG. 22B is an exploded isometric illustration of a focus ring assembly of a lens system in accordance with still another embodiment of the invention.

FIG. 22B is an exploded isometric illustration of a focus ring assembly 295" of a lens system in accordance with yet another embodiment of the invention. In FIG. 22B, a collar 290" (that is configured to receive the shafts of the retention device) includes a raised flange section 272" positioned to extend away from the fitting/camera when the collar receives the shafts of the retention device. The raised flange section 272" includes slots 279" that are also positioned to extend away from the fitting/camera.

In the illustrated embodiment, an outer mechanism 276" is positioned around the flange section 272" of the collar 290". The outer mechanism 276" includes angle slots 274" that are angled between a first surface 264" and a second surface 265" of the outer mechanism 276". In FIG. 22B, an inner mechanism 277" is configured to be coupled to the lens support 232 and lens 234 shown in FIG. 22 so that as the inner mechanism 277" moves toward and away from a fitting/camera the lens support 232 and lens 234 move toward and away from the fitting/camera. The inner mechanism 277" includes pins or bushings 278" on an outer surface of the inner mechanism 277". The bushings extend radially outward from the outer surface of the inner mechanism 277".

In the illustrated embodiment, the inner mechanism 277" is positioned inside the flange section 272" so that the bushings 278" of the inner mechanism 277" extend through the slots 279" in the flange section 272" and into or through the angled slots 274" of the outer mechanism 276". Accordingly, as the outer mechanism 276" is rotated clockwise and counterclockwise, the angled slots 274" of the outer mechanism 276" move relative to the bushings 278" of the inner mechanism 277". As the angled slots 274" move relative to the bushings 278" of the inner mechanism 277", the bushings 278" of the inner mechanism 277" are prevented from rotating a substantial amount by the slots 279" in the collar 290". Accordingly, the bushings 278" of the inner mechanism 277" move in the slots 279" of the collar 290" toward and away from a fitting/camera as the outer mechanism 276" (and the angled slots 274" of the outer mechanism 276") are rotated clockwise and counterclockwise. As the bushings 278" of the inner mechanism 277" move toward and away from the fitting/camera, the inner mechanism 277" and the lens support 232/lens 234 also move toward and away from the fitting/camera, for example, providing a user with a fine focus feature while the retention device is engaged.

In the illustrated embodiment, a grip 275" is coupled to the outside of the outer mechanism 276" to aid a user in rotating the outer mechanism 276". In FIG. 22B, the grip 275" includes one or more knobs or extensions 299" that can aid a user in rotating the grip 275". In selected embodiments, the extension(s) 299" can be used to couple the grip 275" to the outer mechanism 276" (e.g., via threaded portions of the extension(s) 299") with or without other coupling devices and/or techniques. As shown in FIG. 22, the extensions 299" can include one or more portions.

In FIG. 22, the focus ring assembly 295" also includes a cover plate or cover 296". The cover 296" is configured and positioned to be coupled to the collar 290" and to aid in retaining other portion(s) of the focus ring assembly 295" in place. For example, in the illustrated embodiment the cover 296" is coupled to the flange section 272" of the collar 290" via retention devices 281" (e.g., screws). The cover 296" is positioned so that the inner mechanism 277" and the outer mechanism 276" are held or retained proximate to the collar 290", but can move as discussed above (e.g., to provide a fine focus feature while the retention device is engaged). In other embodiments, the focus ring assembly can have other arrangements, including more, fewer, and/or different elements. In still other embodiments, the lens system does not include a focus ring assembly.

Figure 23:
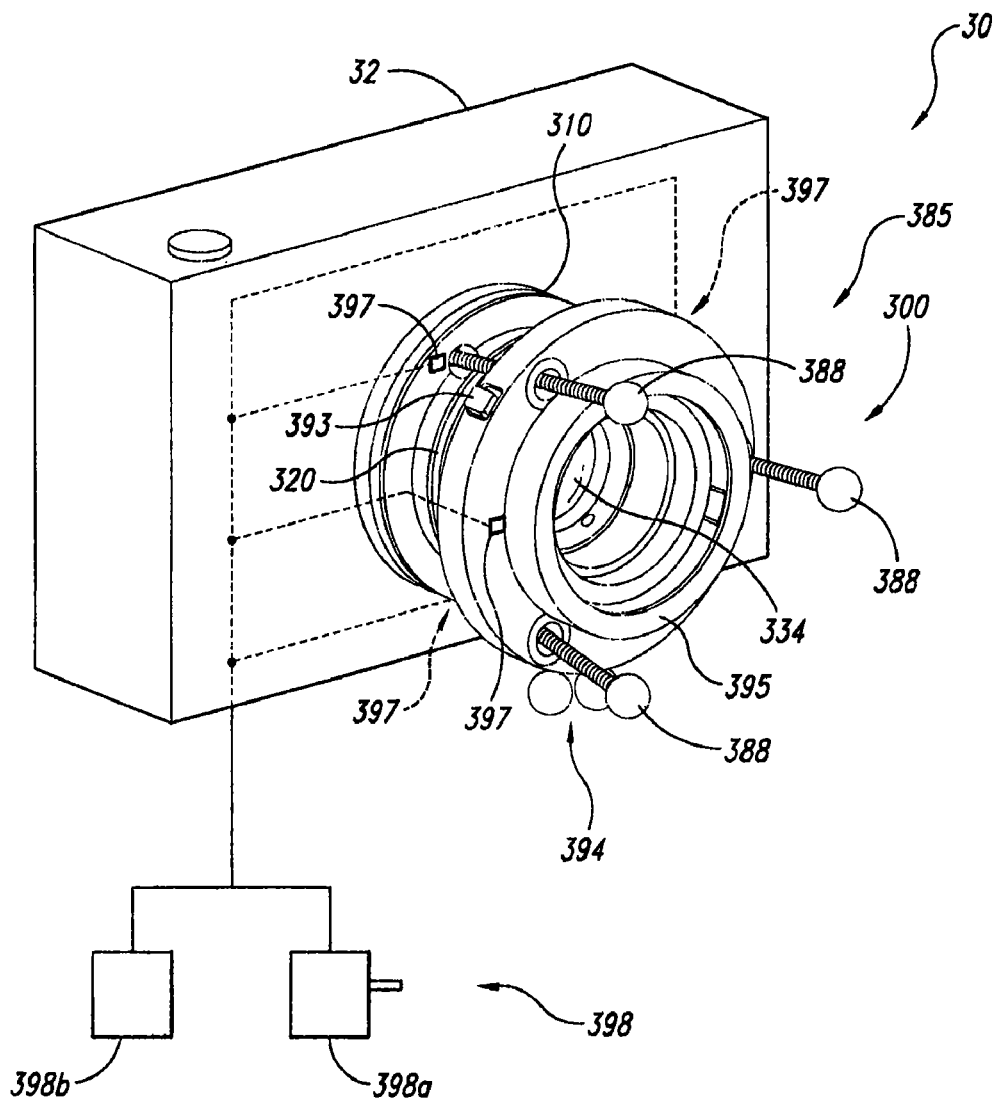
FIG. 23 is an isometric illustration of a camera system with a lens system that includes at least one actuator in accordance with other embodiments of the invention.

FIG. 23 is an isometric illustration of a camera system 30 having a camera 32 and a lens system 300 that includes at least one actuator 397 in accordance with other embodiments of the invention. In FIG. 23, the lens system 300 includes a retention device 385, similar to the retention device discussed above with reference to FIGS. 12-22, but with actuators 397 coupled to shafts 388 and to a focus ring assembly 395. In the illustrated embodiment, the retention device 385 has a disengaged position where a user can grasp a portion of the lens system 300 and manually position a movable body 320, and thereby a lens 334. Once the user has moved the body 320 to a selected position (e.g., a first selected position), the user can engage the retention system by pressing the engagement control 393 so that the retention system retains the body 320 in the selected position.

The user can then use one or more control devices 398 to selectively operate and/or control the actuators 397 to move the body 320 and/or the lens 334 to a second selected position (e.g., to make fine focus adjustments). In FIG. 23, the control devices 398 include a first control device 398a (e.g. a joy stick and/or one or more switches) and a second control device 398b (e.g., an auto focus device similar to those well known to those skilled in the art). In selected embodiments, the control device(s) can include a processor (e.g., a microprocessor) to aid in controlling the operation of the actuators 397.

In the illustrated embodiment, each of the shafts 388 is connected to corresponding actuator 397 so that the shafts can be individually rotated to move the body 320 when the retention device is engaged (e.g., similar to the way the user would manually rotate the shafts 388, discussed above with reference to FIGS. 12-22). Accordingly, in selected embodiments, this feature can be used to adjust the "in/out" focus and/or "tilt" focus as described above. Additionally, in FIG. 23 an actuator 397 is coupled to the focus ring assembly 395 to rotate the focus ring assembly 395, similar to the way a user would manually rotate the focus ring assembly 395 (e.g., as discussed above with reference to FIGS. 20-22). Various actuators and methods for rotating a conventional focus collar on a conventional non-tilting 35 mm camera lens are well known to those skilled in the art and can be used to rotate the focus ring assembly 395. After a photograph is taken, the user can return the retention device 385 to the released or disengaged position using the release control 394, where the body 320 and lens 334 can be manually positioned for another photograph.

Figure 24:
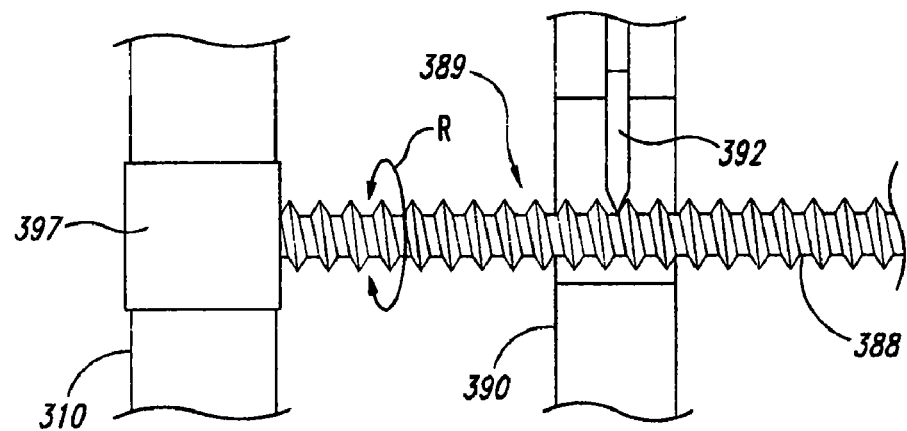
FIG. 24 is a partially schematic illustration of a portion of the lens system and one of the actuators shown in FIG. 23.

FIG. 24 is a partially schematic illustration of a portion of the lens system 300 and one of the actuators 397 shown in FIG. 23. In the illustrated embodiment the actuator 397 is coupled to a fitting 310 (also shown in FIG. 23) and to the shaft 388. The shaft 388 includes an engagement section 389 (e.g., threads) that is engaged by an engagement device 392 carried by a collar 390 (also shown in FIG. 23) when the retention device is in the engaged configuration/position. Accordingly, when the retention device 392 is in the engaged position, a corresponding portion of the collar 390 moves toward and away from the fitting 310 when the actuator 397 rotates the shaft 388 clockwise and counterclockwise (e.g., as indicated by arrows R).

In other embodiments, the lens assembly 385 can have other configurations. For example, in other embodiments the lens system 300 can include more or fewer actuators. For instance, in certain embodiments a single actuator can be used to independently drive multiple shafts. Additionally, the actuators can be carried on different parts of the camera system. For example, although in the illustrated embodiment the actuators 397 coupled to the shafts 388 are carried by a fitting 310 of the lens system 300, in other embodiments the actuators can be carried by the camera 32. Furthermore, in still other embodiments the focus ring assembly 395 and associated actuator(s) 397 (shown in FIG. 23) can also have other configurations. For example, in other embodiments the focus ring 395 can be configured in a manner similar to that discussed above with reference to FIG. 22A.

Figure 25:
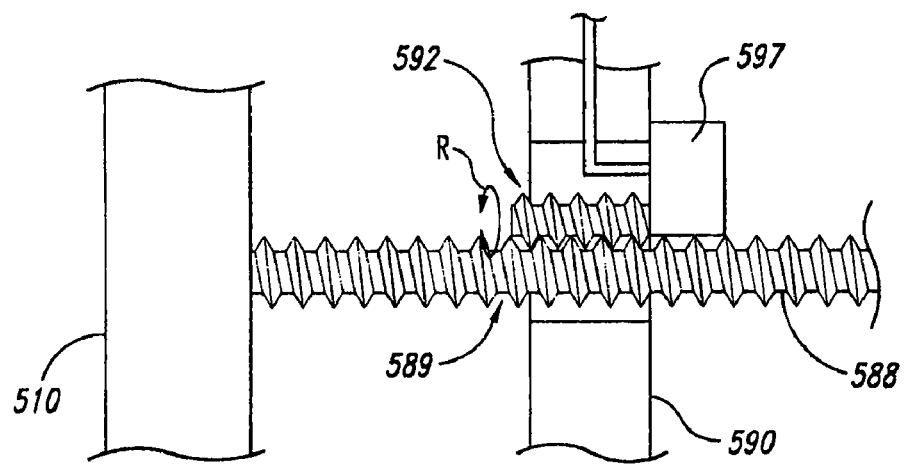
FIG. 25 is a partially schematic illustration of a portion of a lens system with at least one actuator in accordance with other embodiments of the invention.

In still other embodiments, the actuators can have different configurations and/or have different placements. For example, FIG. 25 is a partially schematic illustration of a portion of a lens system having a retention device with at least one actuator 597 in accordance with other embodiments of the invention. In FIG. 25, the lens system includes a fitting 510 and a collar 590 and shafts 588 extending there between, similar to the configuration shown in FIG. 23. However, in FIG. 25 the shaft 588 can be attached (e.g., pivotally attached) to the fitting 510 so that the shaft 588 is not rotatable. The shaft 588 includes an engagement section 589 (e.g., threads), similar to the engagement section shown in FIG. 23. In FIG. 25, an engagement device 592 is carried by the collar 590. However, unlike in the embodiment shown in FIG. 23 where the actuator coupled to the shaft was carried by the fitting, in FIG. 25 the actuator 597 is carried by the collar and coupled to the engagement device 592 (e.g., the actuator can be carried by the engagement device 597 which is carried by the collar 590). In FIG. 25, the engagement device 592 (with the actuator 597) can be moved between the engaged and disengaged position in a manner similar to that discussed above with reference to FIGS. 12-22.

In FIG. 25, the engagement device 592 includes a rotatable gear (e.g., a worm gear with threads) configured to engage the engagement section 589 of the shaft 588 when the retention device is in the engaged position. The actuator 597 is configured and positioned to rotate the engagement device 592 when the engagement device is in an engaged position. Accordingly, when the retention device is in the engaged position the actuator can rotate the rotatable gear clockwise and counterclockwise (e.g., as indicated by arrows R), thereby causing the engagement device 592 to "walk" toward and away from the fitting 510. As the engagement device 592 moves toward and away from the fitting 510, the corresponding portion of the collar 590 moves toward and away from the fitting 510, and can thereby move a movable body and lens coupled to the collar 590.

In still other embodiments, the retention system can include other configurations. For example, FIG. 26 is a partially schematic illustration of a lens system 2600 coupled to a camera 22, in accordance with another embodiment of the invention. In FIG. 26, the lens system 2600 includes a flexible or movable body 2620 extending between a fitting 2610 that is coupled to the camera 22 and a collar 2690 that is coupled to a lens 2634. In the illustrated embodiment, the flexible or movable body 2620 can provide the features discussed above with reference to FIGS. 1-11.

In FIG. 26, the lens system 2600 also includes a retention device 2685 with one or more flexible and/or bendable support elements 2688. In the illustrated embodiment, lens system 2600 includes two flexible support elements 2688. In other embodiments the lens system 2600 can include more or fewer flexible support elements 2688. In FIG. 26, the flexible support elements 2688 are coupled (e.g., attached directly, fixedly attached, pivotally attached, connected, and/or rotatably attached) to the fitting 2610 and to the collar 2690, extending there between. In the illustrated embodiment, the flexible support elements 2688 are coupled to the body 2620 via the fitting 2610 and the collar 2690. In other embodiments, the flexible support elements 2788 can be coupled to the body in other ways (e.g., coupled directly to a portion of the body 2620 without the collar 2690).

In the illustrated embodiment the flexible support elements are bendable to allow the body to be moved among multiple user selected positions. The flexible support elements 2788 can be configured so that once a support element 2788 is bent to a selected position (e.g., straight or curved), the support element 2788 tends to retain that position until a force in excess of a selected threshold is applied to the support element 2688 to move it away from the selected position. Accordingly, once the body 2620 is placed in a selected position, the support elements 2688 are configured to urge the lens to remain in the selected position.

Accordingly, a user can manually position the flexible body 2620 (and lens 2634) in a selected position. As the user moves the flexible body 2620, the flexible support elements 2688 can be bent and moved as the support elements 2688 follow the movement of the body 2620 (e.g., the flexible support element 2688 can be moved to a user selected support element position corresponding to the user selected position of the body 2620). When the user releases the lens system, the flexible support element can urge the body 2620 to remain in the selected position (e.g., resist movement of the body away from the selected position). In other embodiments, the user can also grasp portions of the flexible support elements 2688 and move the support elements 2688 to a selected position (e.g., a selected support element position) corresponding to a desired position of the body 2620. For example, in selected embodiments, the body 2620 can be moved by moving the flexible support elements 2688.

This feature can be particularly useful when the body 2620 includes a resiliently flexible body that has a rest position to which it has a tendency to return after being moved away from the rest position and released. Once a user positions the body in a selected position (away from the rest position), the flexible support element can urge the lens to remain in the selected position. In selected embodiments, this feature can provide steady support for the lens while the user takes a photograph.

The flexible support elements 2688 can be made from various types of materials and/or can have various configurations. For example, in selected embodiments the flexible support elements 2688 can be made from wire, metal, plastic, composite, rubber, or the like. In certain embodiments, the material is flexible and includes the characteristic that causes the flexible support elements 2688 to tend to retain selected positions. For example, the flexible support element 2688 can include a wire that can be bent into various positions. In other embodiments, the structure (e.g., how the materials are arranged or put together) of the flexible support element 2688 provides the flexibility and the characteristic that causes the flexible support elements 2688 to tend to retain selected positions (e.g., a plastic structure configured to hold selected bent positions).

For example, FIG. 27 is an isometric illustration of a lens system 2700 having a retention device 2785 that includes flexible support elements 2788 that include a ball and socket chain arrangement. In FIG. 27, the retention device 2785 includes three support elements 2788. In other embodiments, the retention element 2785 can include more, fewer, and/or different support elements.

In FIG. 27, a flexible body 2720 extends between a fitting 2710 and a collar 2790. The flexible support elements 2788 also extend between the fitting 2710 and the collar 2790 and functions in a manner similar to that discussed above with reference to FIG. 26. FIG. 28 is a partially schematic illustration of a portion of the flexible support element 2688 shown in FIG. 27. The ball and socket chain arrangement in FIG. 28 includes multiple ball and socket chain links coupled together.

In the illustrated embodiment, each ball and socket chain link, section, or segment includes a hollow semi-ball section 2782 or socket section connected to a full-ball section 2783. Each hollow semi-ball section 2782 includes a hollow sphere shaped receptacle sized to receive the full-ball section 2783 of another link. Openings into the hollow sphere shaped receptacle of the semi-ball sections are smaller than the diameter of the full-ball sections 2783 so that when the diameter of the full-ball sections are positioned inside the semi-ball sections (e.g., forced through the openings or formed within the receptacle), the majority of the full-ball sections are held or retained inside the semi-ball sections (e.g., held in the receptacle). Accordingly, once the full-ball sections 2783 are positioned in the semi-ball sections 2782, the full-ball sections 2783 can rotate or move relative to the semi-ball sections 2782, allowing the flexible support elements (shown in FIG. 27) to bend into various positions (e.g., curved and straight positions). The size, shape, and/or configuration of the full-ball sections 2783 and the semi-ball sections 2782 can be configured to provide friction between the joined ball and semi-ball sections so that the flexible support elements 2688 tends to retain a selected position until a force in excess of a selected threshold is applied to move the flexible support elements 2688 to another position. In other embodiments, the flexible support elements 2688 can have yet other configurations.

In selected embodiments, the ball and socket chain arrangement shown in FIGS. 27 and 28 can be coupled to the fitting and/or the collar of the lens system by inserting a ball-like insert that is attached to the fitting or the collar into a semi-ball section of the ball and socket chain arrangement. In other embodiments, a full-ball section of the ball and socket chain arrangement can be inserted into a cavity of the fitting or the collar in a manner similar to how the full-ball sections are inserted into the semi-ball sections of the ball and socket chain arrangement. In still other embodiments the flexible support elements can be coupled or attached directly to a camera (e.g., instead of to a fitting).

E. Additional Methods of Taking Photographic Images

Figure 29:
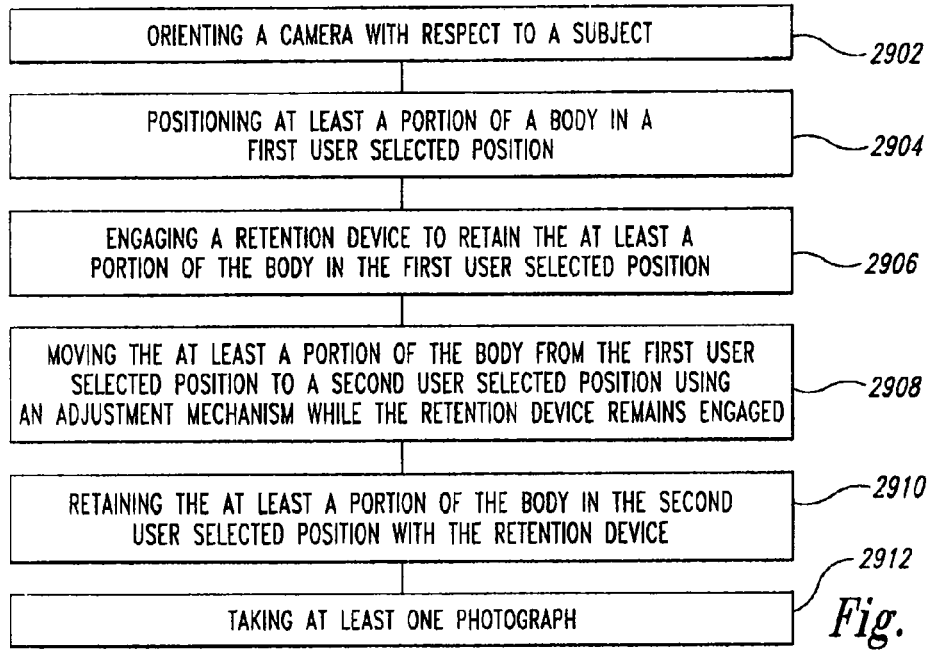
FIG. 29 is a chart with process portions for adjusting focus of a camera using a lens system in accordance with selected embodiments of the invention.

As noted above, certain embodiments of the invention provide methods of taking photographic images. Many of these methods have been discussed above and/or are inherent in the discussion above. However, for the sake of completeness, selected methods will be outlined here. For example, FIG. 29 is a chart with process portions for adjusting focus of a camera using a lens system in accordance with selected embodiments of the invention. The process includes orienting a camera with respect to a subject (process portion 2902). For example, in selected embodiments the camera can be coupled to a lens system that is similar to various embodiments of the lens systems discussed above with reference to FIGS. 12-22A. The process can further include positioning at least a portion of a body in a first user selected position (process portion 2904) and engaging a retention device to retain the at least a portion of the body in the first user selected position (process portion 2906).

In selected embodiments, the process can still further include moving the at least a portion of the body from the first user selected position to a second user selected user position using an adjustment mechanism while the retention device remains engaged (process portion 2908). The process can yet further include retaining the at least a portion of the body in the second user selected position with the retention device (process potion 2910). In other embodiments, the process can include taking at least one photograph (process portion 2912).

Figure 30:
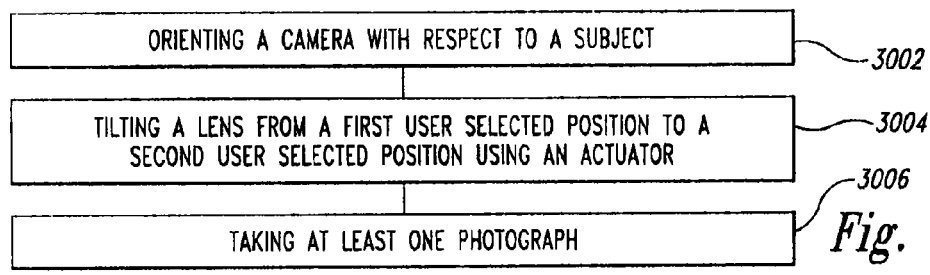
FIG. 30 is a chart with process portions for adjusting focus of a camera using a lens system in accordance with other embodiments of the invention.

FIG. 30 is a chart with process portions for adjusting focus of a camera using a lens system in accordance with other embodiments of the invention. The process includes orienting a camera with respect to a subject (process portion 3002). In selected embodiments, the camera can be coupled to a lens system similar to the various embodiments of lens systems discussed above with reference to FIG. 23. In other embodiments, the camera can be coupled to at least one actuator positioned and configured to tilt a lens without some, or all, of the elements of the retention system discussed above with reference to FIG. 22. The process can further include tilting a lens from a first user selected position to a second user selected position using an actuator (process portion 3004). In selected embodiments, the process can still further include taking at least one photograph (process portion 3006).

Figure 31:
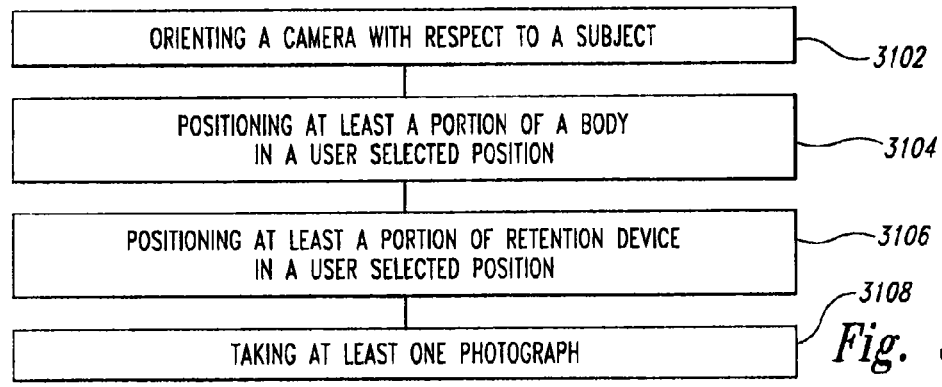
FIG. 31 is a chart with process portions for adjusting focus of a camera using a lens system in accordance with still other embodiments of the invention.

FIG. 31 is a chart with process portions for adjusting focus of a camera using a lens system in accordance with still other embodiments of the invention. The process includes orienting a camera with respect to a subject (process portion 3102). In certain embodiments, the camera can be coupled to a retention device similar to the various embodiments of retention devices discussed above with reference to FIGS. 26-28. The process can further include positioning at least a portion of a body in a user selected position (process portion 3104). In selected embodiments the process can still further include positioning at least a portion of a retention device in a user selected position or user selected support element position (process portion 3106). In certain embodiments the process can yet further include taking at least one photograph (process portion 3108).

The above-detailed embodiments of the invention are not intended to be exhaustive or to limit the invention to the precise form disclosed above. Specific embodiments of, and examples for, the invention are described above for illustrative purposes, but those skilled in the relevant art will recognize that various equivalent modifications are possible within the scope of the invention. For example, whereas steps are presented in a given order, alternative embodiments may perform steps in a different order. The various embodiments described herein can be combined to provide further embodiments.

Unless the context clearly requires otherwise, throughout the description and the claims, the words "comprise," "comprising," and the like are to be construed in an inclusive sense as opposed to an exclusive or exhaustive sense, i.e., in a sense of "including, but not limited to." Additionally, the words "herein," "above," "below," and words of similar import, when used in this application, shall refer to this application as a whole and not to any particular portions of this application. Use of the word "or" in reference to a list of items is intended to cover a) any of the items in the list, b) all of the items in the list, and c) any combination of the items in the list.

In general, the terms used in the following claims should not be construed to limit the invention to the specific embodiments disclosed in the specification unless the above-detailed description explicitly defines such terms. In addition, the inventors contemplate various aspects of the invention in any number of claim forms. Accordingly, the inventors reserve the right to add claims after filing the application to pursue such additional claim forms for other aspects of the invention.

We claim:

1. A lens system comprising:
    a lens;
    a fitting couplable to a camera;
    a resiliently flexible body extending between the lens and the fitting, the body being configured so that at least a portion of the body is movable to allow the lens to be moved among at least two operative positions relative to the camera when the fitting is coupled to the camera, the body having a rest position; and
    a retention device coupled to the body and the fitting, the retention device having an engaged configuration and a disengaged configuration, in the engaged configuration the retention device retains the at least a portion of the body in at least one user selected position, in the disengaged configuration the retention device does not retain the at least a portion of the body in the at least one user selected position,
    wherein the body at least approximately returns to the rest position after being moved away from the rest position and when the retention device is in the disengaged configuration.

2. The system in claim 1 wherein the retention device includes at least one adjusting mechanism to move the at least a portion of the body from a first user selected position to a second user selected position while the retention device is in the engaged configuration.

3. The system of claim 1 wherein the fitting is coupled to a camera.

4. The system of claim 1 wherein the body is couplable to at least one optical device.

5. The system of claim 1 wherein the retention device includes at least one adjusting mechanism to move the at least a portion of the body from a first user selected position to a second user selected position while the retention device is in the engaged configuration, the adjusting mechanism including at least one actuator positioned to move the at least a portion of the body.

6. A lens system comprising:
a lens;
a fitting couplable to a camera;
a body extending between the lens and the fitting, the body being configured so that at least a portion of the body is movable to allow the lens to be moved among at least two operative positions relative to the camera when the fitting is coupled to the camera; and
multiple shafts coupled to the body and to the fitting, the shafts having an engaged configuration and a disengaged configuration, in the engaged configuration the shafts operable to retain the at least a portion of the body in at least one user selected position, in the disengaged configuration the shafts do not retain the at least a portion of the body in the at least one user selected position; and
a collar coupled to the body, the collar having multiple holes, each hole receiving a corresponding shaft, each hole having an engagement device that engages an engagement section of the corresponding shaft when the retention device is in the engaged position and disengages the engagement section of the corresponding shaft when the retention device is in the disengaged position.

7. The system of claim 6, further comprising:
a focus ring assembly operably coupled to the lens and the body, a portion of the focus ring assembly being rotatable in a first direction and a second direction, wherein when the portion of the focus ring assembly is rotated in the first direction the lens moves at least approximately toward the fitting and when the portion of the focus ring assembly is rotated in the second direction the lens moves at least approximately away from the fitting.

8. A lens system comprising:
a lens;
a fitting couplable to a camera;
a body extending between the lens and the fitting, the body being configured so that at least a portion of the body is movable to allow the lens to be moved among at least two operative positions relative to the camera when the fitting is coupled to the camera; and
retention means for retaining the at least a portion of the body in at least one user selected position when the retention means is in an engaged configuration, the retention means having a disengaged configuration wherein the retention means does not retain the at least a portion of the body in the at least one user selected position,
wherein the body is resiliently flexible and structured to substantially resiliently turn to a rest position when the retention means is in the disengaged configuration.

9. The system in claim 8 wherein the retention means includes an adjusting means for moving the at least a portion of the body from a first user selected position to a second user selected position while the retention means remains in the engaged configuration.

10. A lens system comprising:
a lens;
a fitting couplable to a camera;
a body extending between the lens and the fitting, the body being configured so that at least a portion of the body is movable to allow the lens to be moved among at least two operative positions relative to the camera when the fitting is coupled to the camera; and
a retention device coupled to the body and the fitting, the retention device including a plurality of flexible support element, the flexible support elements being flexible to allow the body to be moved among at least two user selected positions, the flexible support elements being configured to urge the body to remain in each user selected position once the body has been placed in the corresponding user selected position.

11. The system of claim 10 wherein the body includes a resiliently flexible body having a rest position to which it has a tendency to return after being moved away from the rest position and released, the at least one of the user selected positions including a first user selected position where the flexible body is positioned away from the rest position, the flexible support elements being configured to urge the lens to remain in the first user selected position once the lens has been placed in the first user selected position.

12. The system of claim 10 wherein the fitting is coupled to a camera.

13. The system of claim 10, further comprising a lens support, the lens being coupled to the body via the lens support.

14. The system of claim 10, further comprising a focus ring assembly operably coupled to the lens and the body, a portion of the focus ring assembly being rotatable in a first direction and a second direction, wherein when the portion of the focus ring assembly is rotated in the first direction the lens moves at least approximately toward the fitting and when the portion of the focus ring assembly is rotated in the second direction the lens moves at least approximately away from the fitting.

15. The system of claim 10 wherein the flexible support elements are bendable into multiple support element positions, each support element position corresponding to at least one of the user selected positions of the body, the flexible support elements being configured to resist movement away from a user selected position once the flexible support elements have been placed in the user selected position.

16. A lens system comprising:
a lens;
a fitting couplable to a camera;
a body extending between the lens and the fitting, the body being configured so that at least a portion of the body is movable to allow the lens to be moved among at least two operative positions relative to the camera when the fitting is coupled to the camera; and
a wire element coupled to the body and the fitting, the wire element being bendable to allow the body to be moved among at least two user selected positions, the wire element being configured to urge the body to remain in each user selected position once the body has been placed in the corresponding user selected position.

17. A lens system comprising:
a lens;
a fitting couplable to a camera;
a body extending between the lens and the fitting, the body being configured so that at least a portion of the body is movable to allow the lens to be moved among at least two operative positions relative to the camera when the fitting is coupled to the camera; and a ball and socket chain arrangement wire element coupled to the body and the fitting, the arrangement being bendable to allow the body to be moved among at least two user selected positions, the arrangement being configured to urge the body to remain in each user selected position once the body has been placed in the corresponding user selected position.

* * * * *